United States Patent [19]

Bachman et al.

[11] 4,392,611
[45] Jul. 12, 1983

[54] SPRAYER CONTROL SYSTEM

[75] Inventors: Wesley J. Bachman; Robert C. Funk, both of Auburn, Ill.

[73] Assignee: Dickey-john Corporation, Auburn, Ill.

[21] Appl. No.: 264,147

[22] Filed: May 15, 1981

[51] Int. Cl.³ .......................... A01M 7/00; B05B 9/06
[52] U.S. Cl. ..................................... 239/74; 222/613; 222/617; 239/155
[58] Field of Search ..................... 239/71, 72, 74, 155, 239/156; 222/613, 614, 617, 623–627, 55, 63

[56] References Cited

U.S. PATENT DOCUMENTS

| | | | |
|---|---|---|---|
| 3,344,993 | 2/1966 | Wilder et al. | 239/305 |
| 3,877,645 | 4/1975 | Oligschlaeger | 239/155 |
| 4,023,020 | 5/1977 | Lestradet | 239/155 X |
| 4,052,003 | 10/1977 | Steffen | 239/71 |
| 4,220,998 | 9/1980 | Kays | 239/172 X |
| 4,230,280 | 10/1980 | Leigh et al. | 239/155 X |

FOREIGN PATENT DOCUMENTS 2466944 4/1981 France .
2045441 10/1980 United Kingdom .

Primary Examiner—Andres Kashnikow
Attorney, Agent, or Firm—Trexler, Bushnell & Wolters, Ltd.

[57] ABSTRACT

An automatic control system for a vehicular liquid sprayer includes a control circuit for receiving a liquid pressure signal and a vehicle ground speed signal and operator accessible controls for delivering to the control circuit signals corresponding to a desired application rate, to the number of nozzles associated with the vehicular liquid sprayer and to the nozzle spacing. The operator may vary the input signal corresponding to desired application rate plus or minus a given percentage to compensate for tolerances in the liquid sprayer system. The control circuit calculates the liquid pressure necessary to achieve the desire application rate and the difference between this desire liquid pressure and the measured liquid pressure and produces control signals corresponding to this difference. A duty cycle control circuit converts these control signals to a cyclical control signal for driving a motor-driven flow control valve. The duty cycle of this cyclical control signal varies in proportion to the magnitude of the pressure difference. This duty cycle controlled signal is automatically modified to overcome inertia and motor lag time in a motor driven flow control valve, and to shut off the valve at a given minimum operating pressure.

21 Claims, 5 Drawing Figures

SPRAYER CONTROL SYSTEM

BACKGROUND OF THE INVENTION

The present invention is directed generally to vehicular liquid sprayers and, more particularly, to an improved automatic control system therefor.

The problems involved in maintaining a relatively uniform density of sprayed liquid from a liquid product vehicular sprayer have long been recognized. For example, in a vehicular liquid sprayer of the type having a spray bar system and a pump for pumping liquid product to the spray bar system it was initially the practice to manually preset either the pump speed or the spray bar pressure in accordance with settings indicated on a chart for a preselected spread density at a fixed vehicle speed, and to then operate the vehicle at that fixed speed. However, it is not always convenient or possible to maintain a precise vehicular speed during the spraying operation. Moreover, a number of other factors which affect the achieved spread density may vary from time to time during the spreading operation. For example, the nominal values of the density of the liquid being spread and the nozzle flow characteristics may vary over time, as may the pressure actually experienced at the nozzles at a given, nominally fixed pump speed.

It has heretofore been proposed, as disclosed in U.S. Patent to Wilder et al U.S. Pat. No. 3,344,993, to vary the speed of the product pump with the vehicle speed in accordance with the ratio between the speed of the product pump and vehicle speed required to maintain a desired density of spread. In Oligschlaeger U.S. Pat. No. 3,877,645, it was further proposed to solve problems associated with the Wilder et al arrangement by controlling a valve to vary the flow rate of liquid product, rather than the pump speed, in accordance with the required ratio between vehicle speed and the pressure of the liquid at the nozzles to achieve the desired application rate.

The foregoing systems were further improved upon in Steffen U.S. Pat. No. 4,052,003, wherein operator accessible programmable controls were proposed. These controls were arranged to vary the control signal fed to a control valve interposed between the pump and the nozzles in accordance with liquid spraying parameters such as the nominal nozzle flow characteristics, the number of nozzles and the spacing between nozzles, and in accordance with the desired application rate. These improvements eliminated the necessity in the prior systems of referring to tables in order to set the proper ground speed to pressure ratio for maintaining a desired application rate, taking into account these other factors.

While each of the foregoing systems has found widespread acceptance, there is room for yet further improvement. For example, it is desirable to avoid "hunting" in the operation of the flow control valve in response to changes in the required pressure for maintaining a desired application rate. Further in this regard, it is desirable to maintain relatively smooth operation of the flow control valve in achieving corrections or variations in the pressure to maintain the desired application rate.

Moreover, it is known that the inertia of the control valve and the lag in the motor utilized to drive the control valve tend to cause delays in achieving a desired pressure in response to the control signal applied to the motor. Hence, it is desirable to adjust the control signal to overcome these factors so as to achieve a more responsive operation of the control valve. On the other hand, below a given minimum pressure, the nozzles will not deliver the desired spray pattern. Hence, the control system should close the valve at or below this pressure.

Additionally, it is known that liquid product density and nozzle flow characteristics often vary in practice from their nominal values. Accordingly, it is desirable to provide corresponding corrections in the response of the control system to correct for these variations. In this regard, the relative density of a given supply of liquid may vary from the nominal density of that liquid. Similarly, the nominal flow characteristics of a given nozzle often vary due to wear of the nozzle over a period of use.

OBJECTS AND SUMMARY OF THE INVENTION

Accordingly, it is a general object of the present invention to provide a new and improved automatic control system for a vehicular liquid sprayer.

A more specific object is to provide such an automatic control system which automatically controls changes in pressure at a rate proportionate with the amount of correction required so as to substantially avoid hunting.

A further object is to provide such an automatic control system which adjusts the rate and amount of pressure control to take into account inertia of the flow control valve and motor drive therefor and lag in the operation of the motor drive.

A related object is to provide such an automatic control system which automatically shuts off the flow control valve at or below a predetermined minimum desired pressure.

Another object is to provide such an automatic control system which is adapted to automatically provide a correction factor for variations in one or more sprayer parameters or liquid parameters from their nominal values.

Yet another object is to provide such an automatic control system which is adapted to operate in conjunction with vehicular liquid sprayers having different spraying characteristics and different operating pressure ranges.

Briefly, and in accordance with the foregoing objects an automatic control system is provided for a vehicular liquid sprayer which pumps liquid at a desired pressure to a plurality of nozzles which dispense liquid at a desired volume per unit area application rate. This application rate is a function of predetermined properties of said vehicular liquid sprayer and of the liquid. The control system comprises a pressure sensor for sensing the instantaneous pressure of the liquid supplied to the nozzles and for producing a corresponding pressure electrical signal and a speed sensor for measuring the ground speed of said vehicular liquid sprayer and for producing a corresponding ground speed electrical signal. A control circuit receives the pressure signal and the ground speed signal, and input electrical signals corresponding to a desired application rate and to nominal values of the properties of the sprayer and of the liquid are set in by operator accessible controls. The control circuit is responsive to the pressure signal, the ground speed signal and the input signals for calculating a desired pressure of the liquid supplied to the nozzles necessary to achieve the desired application rate and for calculating the difference between the desired pressure and the instantaneous pressure. The control circuit produces output control or error signals corresponding to the difference between the desired pressure and the instantaneous pressure and corresponding to the sign of this difference.

In accordance with one aspect of the invention, a duty cycle control circuit converts the error signal to a cyclical control signal of a fixed period whose duty cycle varies in proportion to the magnitude of the difference. A pressure control apparatus is responsive to the cyclical control signal and to the sign of the output control signal for varying the instantaneous pressure in the amount and direction necessary to equal the desired pressure to thereby achieve and thereafter maintain the desired application rate.

In accordance with another aspect of the invention, the control circuit is further responsive to the calculated desired pressure being below a predetermined minimum value for producing a predetermined error signal and a predetermined sign control signal for establishing substantially zero instantaneous pressure to the nozzles. The control circuit is further responsive to the instantaneous pressure being at or below a predetermined minimum value and the calculated desired pressure being at or above the aforementioned predetermined minimum value for producing a predetermined maximum error signal and a predetermined sign control signal until the instantaneous pressure exceeds the predetermined minimum value.

In accordance with another aspect of the invention, the operator accessible controls further include controls for varying the control signal corresponding to the desired application rate by an amount less than or equal to a predetermined percentage so as to achieve and maintain the desired application rate substantially without regard for variations in the sprayer and liquid properties from their nominal values.

BRIEF DESCRIPTION OF THE DRAWINGS

Other objects, features and advantages of the invention will be more readily understood upon reference to the following detailed description of the illustrated embodiment together with reference to the accompanying drawings, wherein.

DETAILED DESCRIPTION OF THE ILLUSTRATED EMBODIMENT

Figure 1:
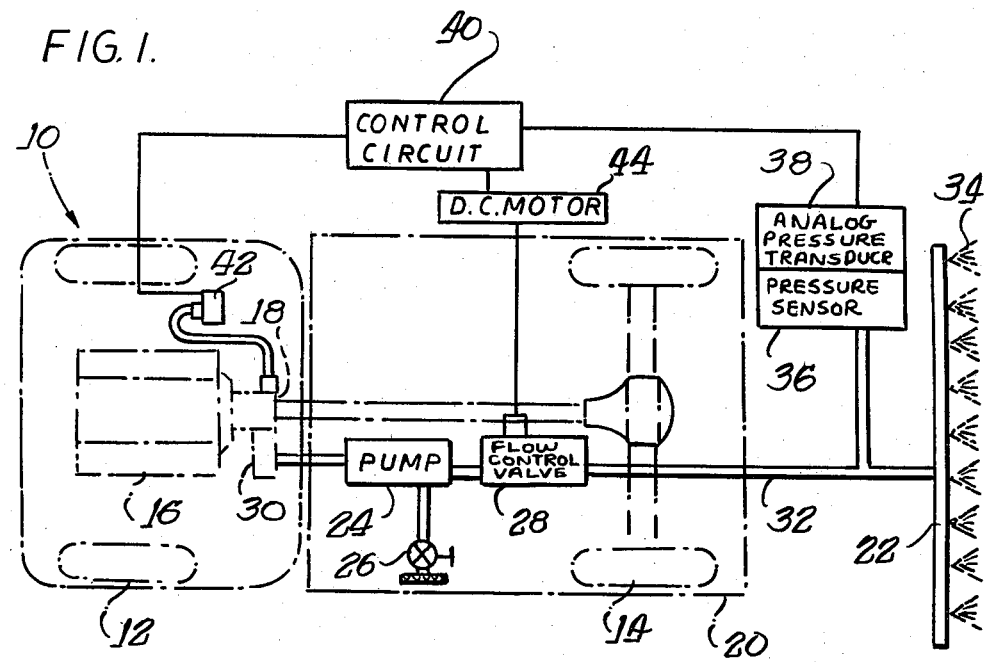
FIG. 1 is a diagrammatic illustration of a vehicular liquid sprayer provided with a novel control system embodying the present invention.

Referring now to the drawings and initially to FIG. 1, a vehicular liquid sprayer is designated generally by the reference numeral 10. As diagrammatically illustrated in FIG. 1, the vehicle 10 includes front and rear ground engaging wheels 12, 14 and a vehicle drive motor 16 which is connected through a suitable power train 18 to drive the rear wheels 14. The liquid distributing or spray apparatus includes a storage tank 20 mounted on the vehicle for storing a quantity of the liquid product to be distributed and a spray bar system 22. This spray bar 22 extends transversely across the rear end of the vehicle 20 for spreading liquid product along a preselected width of spread as the vehicle moves along a selected path.

A pump 24 receives liquid from the supply tank 20 by way of a suitable inlet valve 26 and pumps the liquid to a fluid flow control valve 28. The pump may be driven, for example from a suitable vehicle power take-off 30. The flow control valve 28 delivers the liquid from the pump 24 at a controlled rate of flow through a conduit 32 to the spray bar 22, which is equipped with a plurality of nozzles 34. The pressure of the liquid in the conduit 32 delivered to the spray bar 22 and nozzles 34 is detected by a suitable pressure sensor 36 which may comprise any of a variety of known pressure sensors. An analog pressure transducer 38 converts the output of the pressure sensor 36 to a suitable electrical pressure signal to be delivered to a control circuit 40 according to the invention. This control circuit 40 also receives an electrical signal from a suitable ground speed transducer such as a radar unit (not shown) directed at the ground or tachometer 42 coupled to a suitable point such as the transmission or drive train 18.

The control circuit 40 produces a suitable valve control signal for the flow control valve 28 which is delivered to a suitable valve drive member such as a DC motor 44. In the illustrated embodiment the flow control valve 28 and DC drive motor 44 may comprise any commercially available motor-controlled adjustable valve and need not be described in detail.

It will be appreciated from the foregoing that achieving control of the flow of liquid product to the spray bar 22 by means of the flow control valve 28 achieves control of the rate of application of liquid product by the nozzles 34. Moreover, this application rate may be calculated in terms of gallons per unit acre when the number of nozzles 34, the spacing therebetween and the ground speed of the vehicle 10 are known. Additionally, the pressure in the line or conduit 32 for a given setting of the flow control valve 28 can be determined in accordance with the flow characteristics, and the number, of nozzles 34. Accordingly, the control circuits 40 are adapted to calculate suitable setting for the flow control valve 28 to achieve a desired pressure in the conduit 32 which will cause the nozzles 34 to deliver liquid product at a desired application rate, when the foregoing factors or parameters have been determined.

Additionally, the density of the liquid product relative to some reference, such as the density of water, may also be taken into account by the control circuits 40 in arriving at the proper setting of the flow control valve 28 to achieve a given application rate.

Figure 2:
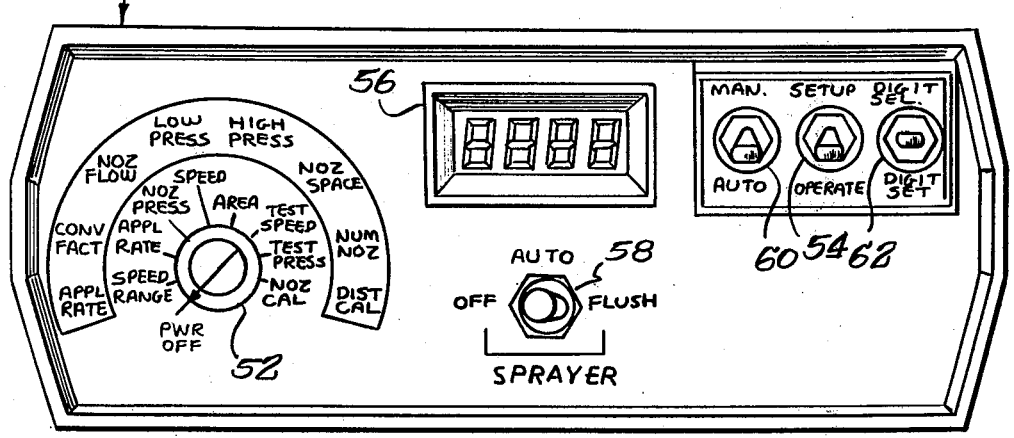
FIG. 2 is a front elevation of an exemplary control panel for the control system of the present invention.

The operation of the control system of the invention will be better understood upon reference to FIG. 2 wherein an exemplary control console 50 is illustrated. This control console 50 includes a rotary function selector dial or switch 52 which is rotatable to one of a plurality of positions for selecting a corresponding function in conjunction with the position of a setup/operate toggle switch 54. When the setup/operate toggle switch 54 is actuated to the setup/position, a plurality of functions for setting up the control system for operation are available for selection by the rotary dial 52, as indicated on the outer ring of function names. Similarly, when the setup/operate switch 54 is actuated to its operate position a plurality of functions indicated on the inner ring about the selector dial 52 are available for selection thereby. Moreover, a display panel 56 displays measured or calculated values corresponding to the selected function when the switch is in either the operate or setup mode. In the illustrated embodiment, this display panel 56 includes four, seven-segment display characters.

A sprayer control toggle switch 58 may be left in its center or AUTO position for normal automatic spraying operation, or alternatively may be switched to its OFF position or FLUSH position so as to manually control the flow control valve 28. In conjunction with this latter operation of the toggle switch 58 a further toggle switch 60 is provided for selecting either manual or automatic operation of the control system. A final toggle control switch 62 is designated a digit select/digit set switch and is utilized as will be seen later to set the values of certain functions selected by the rotary selector dial 52 on the digits of the display 56 to accomplish setup or calibration of the control system for operation in response to a given set of spraying parameters.

Having briefly described the control panel 50 the operation thereof for setting up or calibrating of the spraying control system of the invention and thereafter in monitoring the spraying operation will now be described. Initially, with the control toggle 54 in the setup position, the selector dial 52 may be rotated to its first, application rate setup position, whereupon the operator may enter the desired numerical application rate in gallons per acre in the digits of the digital display 56. The right-most digit 56 will be automatically energized and will advance incrementally when the toggle 62 is actuated to the digit set position. When the right-most digit of the display 56 has advanced to the desired number the toggle 62 is released from the digit set position to hold the digit at this number. The process may be repeated using the toggle 62 to individually "select" and then "set" each successive digit to the left in the display 56 until the desired application rate is displayed in the format XXX.X gallons per acre. The control system of the invention automatically places the decimal in the fashion indicated for the application rate selection function. The displayed number is set into the system when the dial 52 is moved to another position.

Next, a conversion factor corresponding to the density of the liquid product to be sprayed relative to water is entered on the digits of the display 56 in the same fashion, in the format X.XX, where the density of water is taken as 1.00, with denser materials having larger factors. The next position of the dial 52 selects the nozzle flow position, whereupon the flow rate of the particular nozzles 34 associated with the spray apparatus is entered in the digits of the display 56 by actuation of the toggle 62 in the same fashion described above. This flow rate is entered in terms of gallons per minute for 40 PSI pressure at the nozzles 34, in the format XX.XX.

In the next two positions of the dial 52 low pressure and high pressure limitations, in PSI, of the system are set in. The digits of the display 56 are again set to the desired values by operation of the digit select/set toggle switch 62. These values represent the upper and lower limits of system pressure imposed by the nozzle characteristics and/or pump limitations. As will be seen later, operation at a pressure some given amount in excess of the high pressure limit or below the low pressure limit will cause an audible alarm to sound, when these limits have been set in.

The next two positions of the selector dial 58 select nozzle spacing and number of nozzles, respectively. In these two positions the digits of the display 56 are set by operation of the toggle 62 to read the number of nozzles 34 associated with the spray apparatus and the spacing therebetween, respectively. It will be appreciated that the total spray width of the sprayer apparatus and hence the application rate per unit area, may be determined from these settings.

When the dial 52 is in the DIST CAL position, the toggle 62 may be utilized as before to set the display 56 to the number of pulses produced by the particular ground speed sensor 42 used over a given increment of distance. Alternatively, the vehicle may be driven over a measured course (400 feet in the illustrated embodiment) and the toggle 58 actuated to AUTO at the start of the course and to OFF at the end of the course, to achieve automatic setting of this number. The control circuit 40 will now correctly calculate the ground speed from the impulses received from the particular ground speed sensor associated therewith.

During the spraying operation, the toggle 54 is moved to the operate position, whereupon rotation of the selector dial 52 to the speed range indication on the inner ring of indications will cause the upper and lower speed limits of the vehicular sprayer 10 to be displayed in the digits of the display 56. These upper and lower speed limits correspond to the low and high pressure limit settings selected during the setup operation. It will be appreciated that when the setup procedure is completed, and the application rate, conversion factor, nozzle flow rate, nozzle spacing and number of nozzles are fixed, the only variables remaining in achieving the set application rate are the pressure of liquid applied to the spray bar 34 and the ground speed of the vehicular sprayer 10. Accordingly, it will be seen that a given low limit and high limit of the pressure setting will result in a corresponding upper and lower speed limit within which the desired application rate may be maintained. Accordingly, the display of these upper and lower speed limits aids the operator in maintaining the speed of the vehicular sprayer 10 within these limits.

When the selector is moved to the application rate position, the current application rate, based upon the measured vehicle speed and measured pressure in the conduit 32 will be displayed in gallons per acre in the digits of the display 56. This figure should match the application rate selected in the setup mode, excepting transient conditions.

The nozzle pressure position of the selector dial 52 will display the current pressure, in PSI, detected by the pressure sensor 36 in the conduit 32. This reading will be based upon the average of a plurality of pressure readings taken over a one-second interval, updated each second.

When the selector dial 52 is in the area position the digits 56 display the total area, in acres, covered by the spreader, based upon the ground speed thereof and the effective spray width, as determined by the nozzle spacing and the number of nozzle settings in the setup mode. This total area or acreage covered is actively accumulated when the toggle 54 is in the operate position, when the toggle 58 is in either the AUTO or FLUSH positions, and when the selector dial 52 is in any of the positions up to and including the area position. The area count may be reset to zero with the selector dial 52 in the area position by holding the digit select/set toggle 62 in the digit set position for five seconds.

With the toggle 54 still in the operate mode, the remaining positions of the selector dial 52 are for system test purposes. When the vehicle is stationary, the dial 52 may be rotated to the test speed position to verify the accuracy of the control system in achieving the application rate selected in the setup mode. Briefly, the vehicle is left running but stationary with the pump 24 energized. The control circuit 40 internally generates a control signal based upon a known, predetermined vehicle ground speed and energize the flow control valve 28 to the corresponding position to achieve the selected application rate. The liquid discharged from the nozzles 34 in response to this flow control valve setting may be collected for a measured period of time and thereafter the volume of liquid discharged is measured. Hence, the effective application rate may be calculated from the time period of operation and volume of liquid discharged, to allow verification of the accuracy of operation of the control system. Moreover, this simulated ground speed may be observed in the display 56 and modified, if desired, by use of the digit select/digit set toggle switch 62 in the same fashion described above for setting in digits in the setup mode.

With the selector dial 52 in the test pressure position the digits of the display 56 indicate the measured pressure in the conduit 32, with the vehicle stationary, during the application rate test procedure described above. That is, the simulated ground speed provided by the control circuit 40 is in effect, whereby the actual pressure in the conduit 32 may be monitored for comparison with the expected pressure, in view of the number of nozzles and the flow rate or characteristic of the nozzles 34. In accordance with the results of the foregoing test procedure, the operation of the system may be modified or "trimmed" plus or minus 6% in the illustrated embodiment, by next setting the selector dial 52 to the nozzle calibrate (NOZ CAL) position.

It will be recognized that the application rate actually achieved during the foregoing test procedure may vary due to variation in the actual density of the liquid product, or the actual flow rates or characteristics of the nozzles 34, both of which may vary somewhat from the nominal values thereof. In particular, nozzles 34 may become larger than nominal size due to wear over a period of use. Accordingly, in the NOZ CAL position, the digit set position of the toggle 62 may be used to set the righ-most digit of the display 56 to any number up to 6. Additionally, the control circuit 40 of the invention is adapted to display a minus sign in the display 56, whereby each actuation of the digit set toggle 62 increments the display one digit from minus 6 up to (plus) 6. This nozzle calibration or trimming operation effectively adjusts the signal sent to the control circuits in response to the previous application rate setting during the setup mode by a percent corresponding to the number setin.

As briefly indicated above, the sprayer control toggle 58 permits automatic control of the spraying operation when in its automatic (AUTO) position. Additionally, when the toggle 60 is moved from its automatic (AUTO) position to its manual (MAN) position, the sprayer control toggle 58 may be utilized to manually adjust the position of the flow control valve 28. In this regard, movement of the toggle 58 to its off position will cause the flow control valve to move toward its closed position. Similarly, movement of the sprayer control toggle 58 to its flush position will cause the flow control valve to move toward its fully open position. Hence it will be seen that momentary actuation of the sprayer control toggle 58 to either or both of the off and flush positions will result in corresponding small movements of the flow control valve in the corresponding directions, to thereby manually set the flow control valve 28 to a desired position. The application rate achieved in this position may be verified by moving the selector dial to the application rate position (toggle 54 in the operate position) and observing the actual application rate achieved in the display 56. Hence, the flow control valve may be manually controlled by the switch 58 while observing the application rate in this fashion, until the desired application rate is substantially achieved. The sprayer control toggle 58 may also be utilized to flush the spraying structures including the nozzles 34, spray bar 22 and conduit 32 when it is desired to begin spraying a different liquid product.

In accordance with a preferred form of the invention an audible alarm (see FIG. 4) is also provided, and is actuated for a plurality of alarm conditions of operation of the vehicular sprayer 10, generally as follows.

A current-limiting circuit, to be described hereinbelow, is utilized to detect and indicate a current overload or short circuit condition at the ground speed transducer input, pressure transducer input or valve control output. In response to this current overload condition, the control circuit 40 causes a display "ShCr" in the display panel 56, and at the same time continuously sounds the audible alarm.

When the flow control valve 28 is fully open, the alarm will be sounded at a ¼ second on, ¾ second off rate, and "APEr" (application error) will be alternately displayed with the selected function at ½ second intervals. This alarm will only be given when the sprayer control toggle 58 is in the AUTO position.

When the measured pressure in the conduit 32 exceeds the high limit or falls below the low limit set-in during the setup mode, the alarm will sound at a ¼ second on and ¾ second off rate, together with the message "LoPr", or "HiPr" being alternately displayed with the selected function at ½ second intervals. Again, this alarm will only be given with the sprayer control toggle 58 in the AUTO position.

Finally, the control circuit 40 is provided with an internal checking system, to be described hereinbelow, such that upon initially powering up the system, or upon changing of position of either the setup/operate toggle 54 or of the selector dial 52, the alarm will be sounded continuously and the message FAIL displayed in the panel 56, if a processor malfunction should occur in the control circuits 40.

Figure 3:
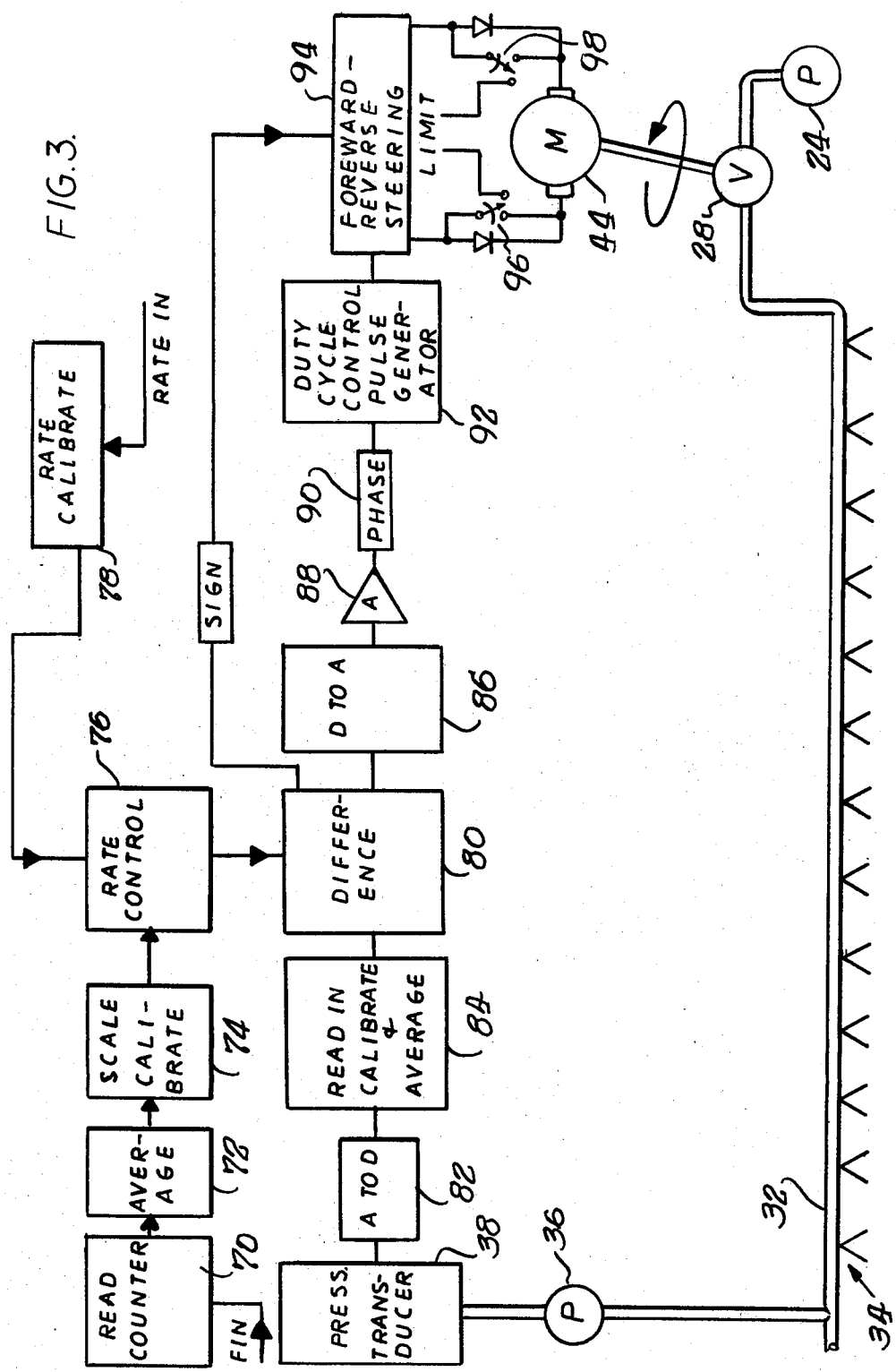
FIG. 3 is a functional block diagram illustrating the operation of the control system of the invention.

Reference is next invited to FIG. 3, wherein a functional block diagram illustrates the operation of the control system of the invention in controlling the application rate of the vehicular liquid sprayer 10. The output of the ground speed sensor or tachometer 42 forms an input to a read counter 70 which functions to count the impulses produced by the ground speed sensor 42 and to digitally read this count at substantially 0.0125 second intervals. The read counter 70 also averages each ten digital readings and feeds this digital average to an "average" functional block 72, at substantially 0.125 second intervals.

This "average" functional block 72 then averages the last eight readings received from the read counter 70. These two averaging operations act as a digital filter to eliminate rapid frequency changes in the transducer output caused by "bouncing" of the vehicle 10 or the like. A scale and calibrate functional block 74 receives these averaged readings from the average functional block 72 and multiplies them by the calibration factors set in, as previously described, in the setup mode. Hence, the impulses received from the ground speed transducer 42 are converted into a "number" or signal representative of the ground speed, in miles per hour, of the vehicular sprayer 10.

The calibrated ground speed figure is then fed from the functional block 74 into a rate control functional block 76. The desired application rate set in during the setup mode is then applied through a suitable calibration functional block 78 to the rate control functional block 76.

The calibrated, desired application rate is then multiplied with the ground speed by the rate control functional block 76 and the squared value of this multiplication is output at substantially 0.125 second intervals to a difference functional block 80.

It will be noted that each of the foregoing functional blocks operate in digital form, so that in the illustrated embodiment, a six bit digital number representing the result of the foregoing operations is fed to the difference functional block 80. The number of nozzles and spacing therebetween, which together comprise the effective spread width of the liquid sprayer may also be multiplied by the ground speed and squared by the rate control functional block 76. Additionally, the number of nozzles multiplied by the nozzle orifice constant or nozzle flow rate may be squared and utilized as a divisor for the product of miles per hour, flow rate and effective spread width in the rate control block 76.

The difference functional block 80 receives a second digital input derived from the pressure sensor 36 by way of the analog pressure transducer 38. In the illustrated embodiment the analog pressure transducer 38 operates on a one-to-five volt output scale wherein zero PSI is set equal to one volt and sixty PSI is set equal to five volts. The equivalent PSI for the five volt upper end of the scale of the pressure transducer block 38 may be modified, and hence the scale compressed, for use with vehicular liquid sprayers which operate at a higher pressure rating or range. The output of the pressure transducer is fed to an analog-to-digital converter functional block (A to D) 82 which converts this analog voltage to a digital signal, which is fed to a read-in, calibrate and average functional block 84.

This latter functional block 84 reads the output of the analog-to-digital converter 82 at substantially a 12.5 millisecond rate adding in any necessary offset correction for variations in the response of the transducer 36. The functional block 84 then averages each four such calibrated pressure readings and feeds an equivalent 6-bit digital signal to the difference functional block 80.

The difference functional block 80 calculates the digital difference between the signals input thereto by the rate control block 76 and read-in, calibrate and average block 84. This difference is output in seven bit digital form, six bits thereof comprising the value of the difference and the seventh bit comprising the sign of this difference. This six bit difference, also referred to as the error signal is fed to a six bit digital-to-analog converter functional block 86 which converts the six bit digital error number to an analog voltage form for driving a suitable amplifier functional block 88 and a series connected phase control functional block 90. The output of the phase control block 90 feeds a duty cycle controlled pulse generator functional block 92 whose output in turn feeds a forward-reverse steering functional block 94 which controls operation of the DC motor 44. The seventh or error sign bit is fed directly to this forward-reverse steering functional block 94 to control the direction of rotation of the motor 44. The motor control circuitry for the motor 44 includes a pair of limit switches 96, 98 which form part of the valve control assembly and are respectively actuated when the valve is in its fully open and fully closed position for de-energizing the motor 44.

Briefly, the duty cycle control pulse generator outputs a cyclical control signal whose duty cycle is proportionate with the magnitude of the six bit error signal, thereby causing the forward-reverse steering block 94 to energize the motor 44 in a duty cycle controlled fashion correlative with the magnitude of the error detected between the modified ground speed signal and pressure signal received at the difference block 80. In this way, the motor will rotate the valve relatively rapidly when a large error signal, indicating the need for a relatively large correction of the position of the valve 28, is produced. Conversely, the motor will rotate the valve relatively slowly when a small error signal, indicating the need for a relatively small correction in the position of the valve 28, is produced.

The following equations relating flow rate to the other system variables may be helpful in understanding the signal processing described above. Initially, the flow through a conduit such as the conduit 32 is proportionate to the square root of the pressure therein, or conversely, the pressure in the conduit 32 is proportionate to the square of the flow rate therethrough. Hence, the flow rate R may be calculated as follows:

$$R = nk\sqrt{P}$$

where
n = the number of nozzles 34
p = the pressure at the nozzles 34
k = the nozzle orifice constant, or nozzle flow rate.

Similarly, the application rate in terms of volume per unit area is equal to the flow rate divided by the product of the ground speed of the vehicle and the effective spread width. The effective spread width is substantially equal to the number of nozzles multiplied by the spacing (sp) therebetween. Hence, $$\text{application rate} = nk\sqrt{P} \div \text{speed} \times n \times sp; \text{ or}$$

$$\text{application rate} = \sqrt{P} \div \frac{(\text{speed} \cdot n \cdot sp)}{n \cdot k}$$

Accordingly, it will be seen the pressure of this system may be controlled to achieve a desired application rate, in view of the other variables, in accordance with the following equation:

$$\sqrt{P} = \text{application rate} \times \frac{(\text{speed} \cdot sp)}{k}$$

Figure 4A:
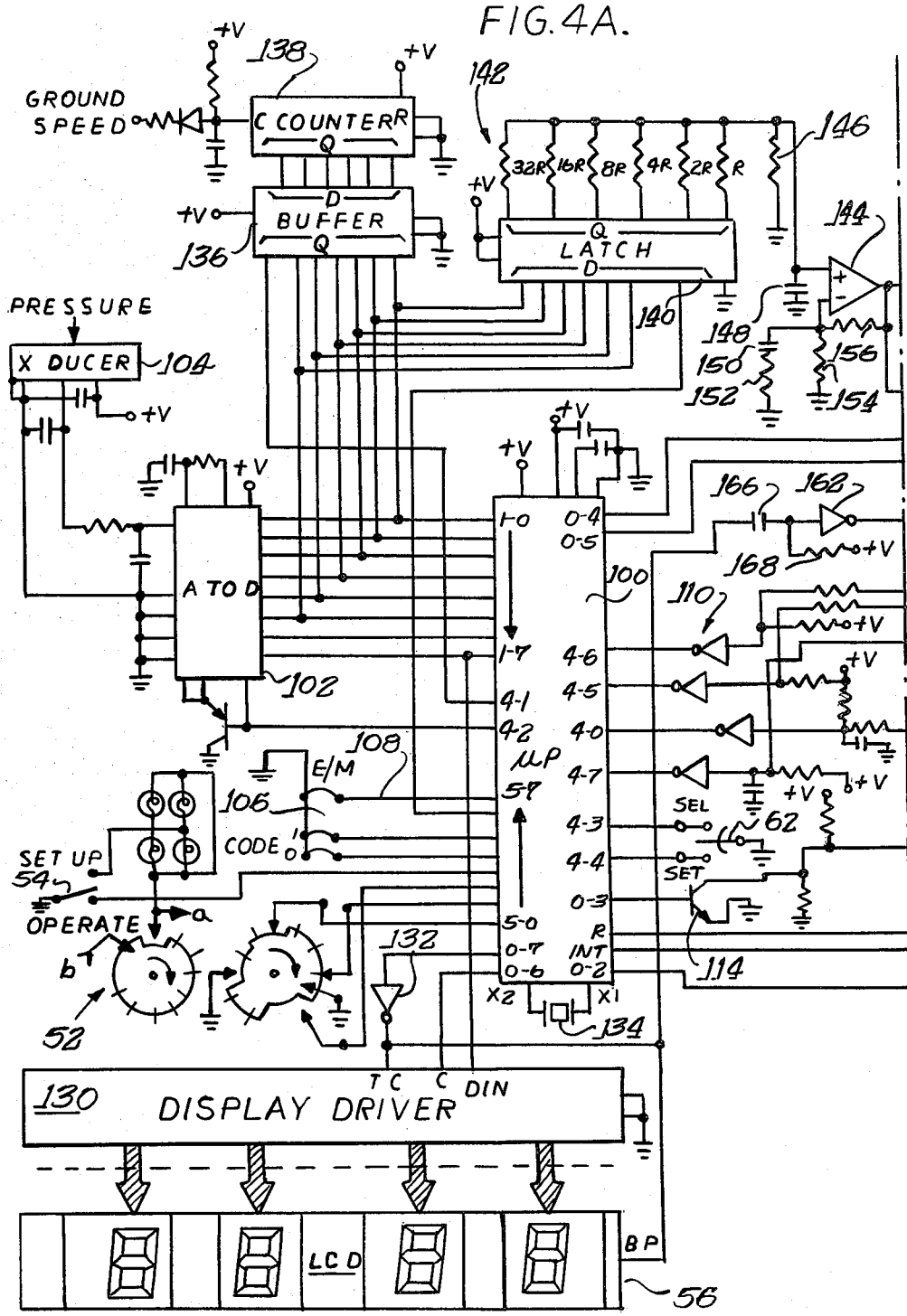
FIGS. 4A and 4B, taken together, form a schematic circuit diagram of a preferred embodiment of the control system of the invention.
Figure 4B:
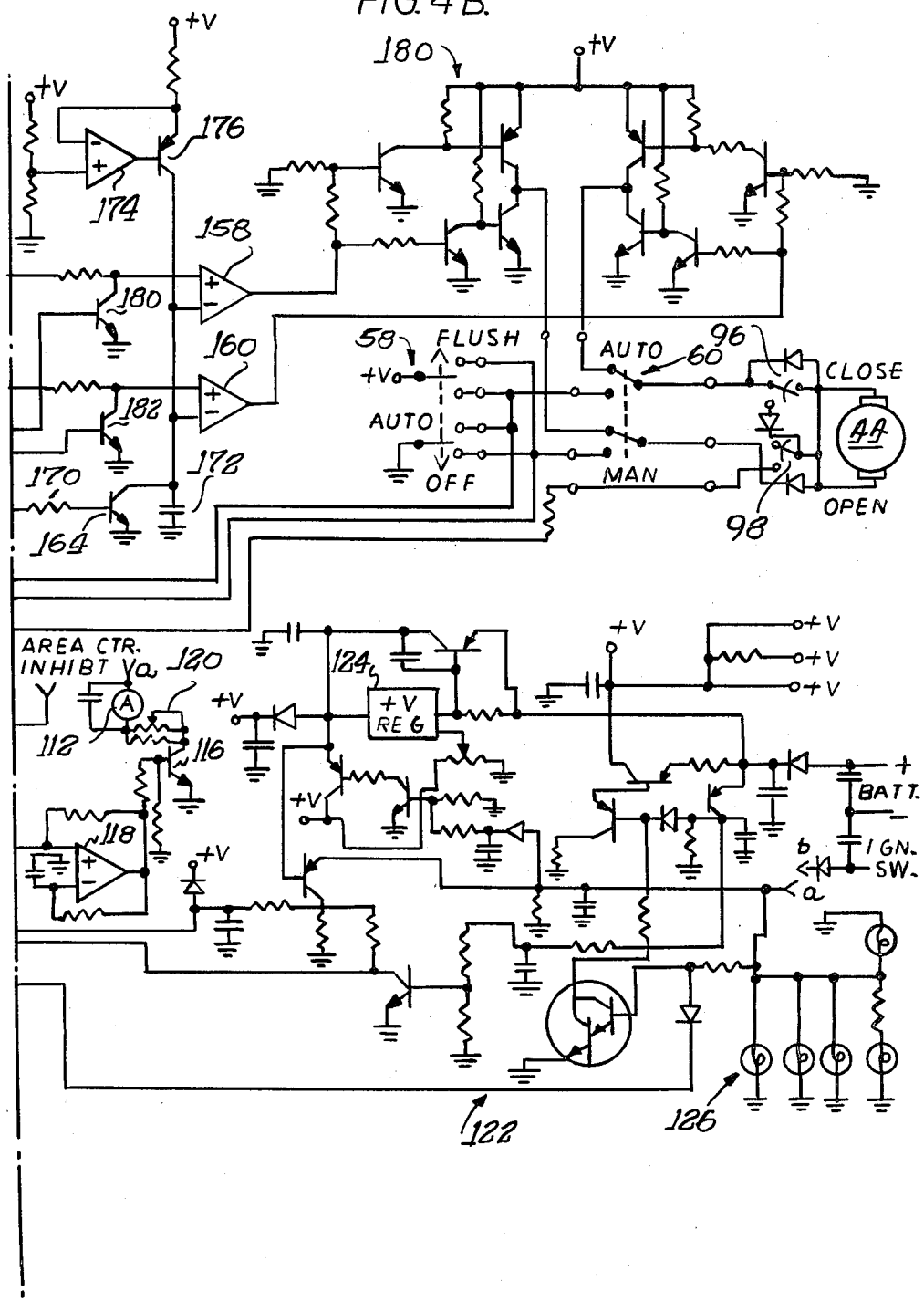

Referring now to FIGS. 4A and 4B an exemplary control system in accordance with a preferred form of the invention is illustrated in circuit schematic form.

The functions and operations described above with reference to FIG. 2 and FIG. 3 are carried out by a microprocessor 100 which in the illustrated embodiment comprises a single chip microcomputer of the type generally designated MK3872. The microprocessor 100 includes four 8-bit input/output ports, which are designated by hyphenated numbers, the first number indicating the port number and the second number indicating the bit number.

The eight bits of port one, 1-0 through 1-7 inclusive, receive inputs from the respective outputs of an analog-to-digital (A to D) converter 102, which in the illustrated embodiments is of the type generally designated ADC0804LCN. This A to D converter receives an analog input from a pressure transducer 104 which produces an analog signal at a predetermined level in response to signals from the pressure sensor 36. The functions of the A to D converter 102 and transducer 104 correspond generally to those of the functional blocks 38 and 82 of FIG. 3 described above. In the illustrated embodiment, the pressure transducer circuit 104 is of the type generally designated LX1820G available for example from National Semiconductor.

The eight bits of port 5 of the microprocessor 100 receive control inputs from the setup/operate toggle control 54 and the rotary selector dial 52 of FIG. 2 and decode the positions of these two controls. Additionally, port 5 receives control inputs from a pair of code terminals 106 and an English/Metric (E/M) terminal 108. Briefly, the English/Metric terminal may be selectively coupled with a ground potential to indicate whether the operation of the system is to be in English units or Metric units. In this regard, all of the above-described setup procedures and display functions may be alternatively carried out in accordance with the Metric system by connecting a jumper to ground at the terminal 108. The microprocessor 100 is programmed to automatically carry out this conversion. The code terminals 106 present a 2-bit binary code to the microprocessor port 5 which indicates the identity of one of four types of vehicular sprayer 10 with which the control system is associated. In this regard, the code terminals 106 are utilized to indicate to the microprocessor one of four possible operating pressure ranges of the vehicular sprayer, whereby the pressure limits described above, as well as other operating pressure limits to be described hereinbelow are modified accordingly. Again, the microprocessor 100 is programmed to automatically effect these modifications.

Port 4 of the microprocessor 100 receives control input signals from the digit select/digit set control toggle 62, as well as from the sprayer control toggle 58, the auto/manual control toggle 60 and the limit switches 96, 98 (see FIG. 4B). These signals are fed to port 4 of the microprocessor 100 by way of suitable intervening circuits including buffers 110. Port 4 of the microprocessor 100 also receives an area counter inhibit signal by way of one of the buffers 110, which may be energized to inhibit operation of the area counter if desired. Suitable positive voltage pullups are also provided to the buffers 110.

Port 0 of the microprocessor 100 is utilized generally as an output port, port 0-3 providing the control output signals to an audible alarm 112, by way of a suitable energizing circuit therefor including transistors 114, 116 and an operational amplifier 118. The loudness or volume of the alarm 112 may be controlled by a suitable potentiometer 120. This alarm 112, in conjunction with the microprocessor 100 provides the alarm functions discussed above.

The 0-2 output bit of the microprocessor 100 cooperates with reset (R) and interrupt (INT) inputs to the microprocessor 100 for controlling a power up sequence of the system and are coupled with suitable points in a power supply circuit designated generally by the reference numeral 122. This power supply circuit provides regulated voltage by way of a suitable voltage regulation integrated circuit 124 (e.g., MC1404U5) and further provides a suitable power source for a plurality of lamps designated generally by the reference numeral 126 which form a back light for the display 56. The power supply 122 is coupled to the vehicle battery and ignition switch as indicated at the lower right hand side of FIG. 4B. Additionally, a terminal b from the ignition switch feeds a terminal b of the selector dial 52, while a terminal a associated with selector dial 52 feeds the like-designated terminal a (immediately below terminal b) in the power supply 122. The other components of the power supply circuit 122 are arranged in conventional fashion to achieve a suitable power up and power down control cycle for the circuits of FIGS. 4A and 4B, and in particular for the microprocessor 100.

Bit 6 of port 0 (0-6) of the microprocessor 100 feeds a clock signal (C) to a suitable display driver circuit 130, which in the illustrated embodiment comprises an LCD display driver of the type generally designated MD4332B. The display panel 56 comprises a four, 7-segment liquid crystal display (LCD). The 0-7-bit of port 0 of the microprocessor 100 feeds a further clock signal both to the back plane of the LCD 56 and to a synchronization control terminal T/C of the display driver circuit 130, by way of a suitable buffer 132. The serial data input Din of the display driver 130 is fed from the 1-7 terminal of the microprocessor 100. The microprocessor internally generates suitable master control frequency signals from a conventional 4 MHz crystal element 134 coupled to control input terminals X1 and X2 thereof. The remaining bits 4-1 and 4-2 of port 4 of the microprocessor 100 are utilized to control the operation of the A to D converter 102, and to control the operation of a buffer 136 associated with the ground speed input circuit.

In this latter regard, the input signal from the ground speed transducer is fed to a 6-bit counter 138 which feeds its 6-bit output to the inputs of the buffer 136. The outputs of this buffer are coupled in common with the outputs of the A to D converter 102 at the first six bits of port 1 of the microprocessor 100. In the illustrated embodiment, the counter 138 comprises a seven stage binary counter of the type generally designated CD4024 and the buffer 136 comprises a hex inverter buffer of the type generally designated CD4502.

In accordance with a feature of the invention, the first six bits (1-0 through 1-5) of port 1 of the microprocessor 100 also serve as output ports to a latch comprising a hex D-type flip-flop 140, e.g., CD40174. The Q outputs of the latch 140 feed six resistors designated generally by the reference numeral 142 whose values increase in binary fashion R, 2R, 4R, etc., to in effect form an analog of a six bit binary code. Hence, the latch 140 and resistors 142 serve as a digital-to-analog converter, substantially performing the function of the six bit digital-to-analog converter functional block 86 of FIG. 3.

Functionally, the microprocessor effectively performs the functions of the blocks 70, 72, 74, 76, 78, 80 and 84 of the functional block diagram of FIG. 3. Hence, the six bit binary number fed to the latch 140 of FIG. 4A comprises the six bit difference or error calculated between the digital pressure signal and the digitized ground speed signal modified by application rate, number of nozzles, spacing between nozzles and nozzle flow rate as described above. In effect, then, the microprocessor 100 monitors the pressure in the conduit 32 and the ground speed of the vehicle 10, as modified by the foregoing factors, and calculates the value of a desired pressure at which the desired application rate will be achieved, given the present values of the spraying parameters and monitored ground speed and pressure fed into the microprocessor 100. This desired pressure is then compared with the present or instantaneous pressure sensed in the conduit 32 and a six bit error signal representing the difference therebetween is developed and fed to the latch 140.

This six bit code effectively selects an analog equivalent error signal by energizing the outputs to selected ones of the resistors 142. The opposite ends of these resistors 142 are tied in common to the non-inverting input of an operational amplifier 144, so as to feed a level of current thereto which is an analog of the six bit digital difference or error signal developed by the microprocessor 100. An RC network comprising a resistor 146 and a capacitor 148 associated with the non-inverting input of the op amp 144, and a capacitor 150 and resistors 152, 154 and feedback resistor 156 associated with the inverting input thereof form the equivalent function of the phase control block 90 of FIG. 3. The operational amplifier 144 essentially performs the function of the amplifier block 88 of FIG. 3.

The output of the operational amplifier 144 is fed to the respective non-inverting inputs of a pair of comparators 158, 160. The inverting inputs of these comparators 158, 160 receive a cyclical ramp signal of predetermined peak to peak value and at a controlled, constant frequency, and therefore constant period. This signal is derived from the output 0-7 of the microprocessor 100, which is the same output feeding the synchronizing input T/C of the display driver 130 and the back plane input (BP) of the display 56. In the illustrated embodiment the frequency of this signal is on the order of 40 Hz and is fed to a ramp generating circuit comprising a buffer 162 and a grounded-emitter, NPN transistor 164. A suitable capacitor 166 is provided in series with the input to the buffer 162 and a voltage pullup is provided by a suitable resistor 168. A series resistor 170 is interposed between the output of the buffer 162 and the base electrode of the transistor 164. The collector electrode of the transistor 164 provides the output to the inverting input of each of the op amps 158 and 160 and is further provided with a suitable capacitor 172 to ground. A suitable constant current source is provided at the collector electrode of the transistor 164 by a circuit comprising an operational amplifier 174 and a transistor 176 (PNP).

In operation, then, the comparators 158 and 160 each compares the magnitude of the error signal produced by the digital-to-analog converter comprising latch 140 and resistors 142, as amplified and phase controlled by the op amp 144 and associated RC circuits and compares the signal with the 40 Hz ramp signal generated at the collector electrode of the transistor 164 as just described. It will be noted in this regard that the magnitude of the error signal produced by the microprocessor bears an inverse relation to the error or difference between desired pressure and instantaneous measured pressure calculated thereby. Accordingly, as this error increases the signals at the non-inverting inputs of the op amps 158 and 160 correspondingly decrease, thereby allowing a greater proportion of the ramp signal at the inverting inputs thereof to be passed to their respective outputs. As the error signal decreases, the opposite effect takes place with a correspondingly decreasing proportion of the ramp signal being effectively passed to the outputs of the op amps 158 and 160. Hence, the effective duty cycle of the signal appearing at the outputs of the op amps 158 and 160 is controlled in proportion to the magnitude of the error signal generated at the digital-to-analog converter (latch 140 and resistors 142) as modified by the amplifier and phase control circuit comprising op amp 40 and associated RC circuit.

Bits 0-4 and 0-5 of port 0 of microprocessor 100 are utilized to output a binary signal indicating the sign of the error or difference signal. Accordingly, the respective signals from the 0-4 and 0-5 outputs are fed to the base electrodes of respective grounded emitter NPN transistors 180 and 182 which have their collector electrodes tied to the respective non-inverting inputs of the op amps 158 and 160. These transistors 180 and 182 act as switching transistors to effectively deliver the analog error signal from the op amp 144 to only one of the two op amps 158 and 160, thereby effectively indicating the sign of the error and therefore the direction in which the motor 44 is to be rotated for rotating the valve 28 toward its open condition or toward its closed condition, respectively.

In this regard, the respective outputs of the op amps 158 and 160 feed respective inputs of a conventional, differential comparator-type motor drive circuit designated generally by the reference numeral 180. The respective outputs of this differential comparator circuit 180 feeds the two sides of the motor 44 which are designated, respectively, close and open, indicating the direction in which that polarity of the motor 44 tends to drive the valve 28. The auto/manual toggle 60 is interposed in these control lines to the motor 44, and the limit switches 96 and 98 are also in circuit with this motor 44, together with suitable diodes, as illustrated in FIG. 4B. The sprayer control toggle 58 is also coupled in circuit with the control toggle 60 and motor 44 as illustrated.

It will be appreciated that when the auto/manual toggle 60 is in the AUTO position the control signals from the motor drive circuit 180 will control rotation of the motor 44, subject to the limit switches 96 and 98. However, when the toggle 60 is moved to its upper or manual position, the motor 44 will be under the control of the sprayer control toggle 58 to be actuated either in the open direction for rotating the valve 28 open of the sprayer system or in the closed direction for rotating the valve 28 toward its closed position, respectively. Hence, it will be seen that manipulation of the toggle 58 momentarily to either of its flush or off positions will cause momentary rotation of the motor 44 for driving the valve 28 correspondingly toward either its open condition or its closed condition, respectively.

In accordance with one specific form of the invention, the circuit of FIGS. 4A and 4B, and in particular the microprocessor 100 is programmed by utilization of the code terminals 106 to accommodate a vehicular sprayer 10 whose nominal pressure range is from on the order of 8 PSI to on the order of 60 PSI. In this case, the microprocessor is suitably programmed to control the motor 44 and hence rotation of the flow control valve 28 generally as follows.

It will be recalled that the error signal output on the bits 1-0 through 1-5 is a six bit, magnitude-related signal, the sign thereof being given on the output bits 0-4 and 0-5. In the example mentioned above (8 PSI-60 PSI range sprayer) the least significant bit of the error magnitude output has an error value of substantially on the order of 0.29 PSI. The microprocessor 100 is programmed in the present example such that if the desired pressure calculated thereby is greater than or equal to 4.5 PSI and the measured, instantaneous pressure in the conduit 32 is greater than 2 PSI, the six bit error output is inversely proportional to the pressure error, that is, the difference between the desired and actual pressures. However, if the desired pressure is less than 4.5 PSI, the error output and error sign output present a suitable signal level to the non-inverting input of the op amp 160, so as to rotate the motor in the direction for driving the valve to its closed position. It is assumed in this case that pressures below 4.5 PSI will not produce an adequate spray pattern from the nozzles 34 in a vehicular sprayer which operates in the above-noted 8-60 PSI range. Hence, it is desirable to close the valve and at the same time activate the alarm and display for the pressure being below the desired lower limit, as described above.

If the desired calculated pressure is greater than or equal to 4.5 PSI and the measured or instantaneous pressure in the conduit 32 is less than or equal to 2 PSI, the error output signal is driven to its maximum level, of positive sign, whereby a minimum signal level is presented to the non-inverting input of the op amp 158. This in turn produces the maximum duty cycle signal driving the motor 44 at its maximum rate for rotating the valve 28 toward its fully open condition. It will be understood that the 2 PSI minimum will be shortly exceeded, whereupon the error signal will be shortly brought back to the proportional range mentioned above.

In each of the foregoing cases the corresponding duty cycle signal is fed to the motor drive circuit 180 from the energized operational amplifier 158 or 160, as the case may be. In the latter case, it will be recognized that a greater torque must be applied in order to unseat and reseat the valve from and to its fully closed position, respectively. Accordingly, it is desirable to initially apply a maximum signal level to the motor 44 for these purposes. Similarly, the phase control circuit comprising the RC components associated with the op amp 144 are designed to overcome the initial lag characteristics of the motor 44 in order to assure a more responsive operation of the valve 28 at the onset of production of an error signal by the microprocessor 100 and digital-to-analog conversion circuit comprising the latch 140 and resistors 142.

The foregoing PSI levels at which the microprocessor achieves modes of control described above will be automatically modified by the microprocessor 100 upon the application of a different code to the code terminals 106, indicating a different operating pressure range of the vehicular liquid spreader 10.

In order to fully describe a specific embodiment of the invention, the following pages reproduce an exemplary program for the microprocessor 100.

```
                    0001  *
              ;     0002  *
                    0003          TITLE 'SPRAYER CONTROL II    RCFUNK     8/21
    ./              0004  *
                    0005  *
0000  1A            0006  MAIN    DI
0001  74            0007          LIS    4
0002  B0            0008          OUTS   0
0003  70            0009          CLR
0004  B1            0010          OUTS   1
0005  B6            0011          OUTS   6
0006  58            0012          LR     8,A
0007  B4            0013          OUTS   4
0008  B5            0014          OUTS   5
0009  2A0E82 0E82   0015          DCI    MSINIT
000C  290DC9 0DC9   0016          PI     MESDIS
000F  1A            0017          DI
0010  70            0018          CLR
0011  50            0019          LR     0,A
0012  51            0020          LR     1,A
0013  30            0021          DS     0
0014  94FE   0013   0022          BNZ    *-1
0016  31            0023          DS     1
0017  94FB   0013   0024          BNZ    *-4
0019  B0            0025          OUTS   0                  ENABLE EXTRN POWER
001A  904E   0069   0026          BR     CALOP              CHECK SHORT-CIRCUIT
                    0027  *
                    0028          ORG    H'20'
0020  1E            0029  TIMER   LR     J,W
0021  5A            0030          LR     10,A
0022  0A            0031          LR     A,IS
0023  5B            0032          LR     11,A
0024  2080          0033          LI     H'80'
0026  E8            0034          XS     8                  TOGGLE LCD DRIVE
0027  58            0035          LR     8,A
0028  21B8          0036          NI     H'B8'
002A  B0            0037          OUTS   0
002B  74            0038          LIS    4
002C  B4            0039          OUTS   4                  READ PRESSURE
002D  A1            0040          INS    1
002E  18            0041          COM
002F  50            0042          LR     0,A
0030  72            0043          LIS    2
0031  B4            0044          OUTS   4
0032  62            0045          LISU   2
0033  6E            0046          LISL   6
```

```
0034 4C              0047          LR      A,S
0035 C0              0048          AS      0
0036 5D              0049          LR      I,A
0037 4C              0050          LR      A,S
0038 19              0051          LNK
0039 5C              0052          LR      S,A
003A A1              0053  TIM1    INS     1
003B 50              0054          LR      0,A          GET STABLE DIST COUNTS
003C A1              0055          INS     1
003D E0              0056          XS      0
003E 94FB       003A 0057          BNZ     TIM1
0040 6C              0058          LISL    4
0041 4C              0059          LR      A,S          GET LAST DIST COUNTER RDIN
0042 18              0060          COM
0043 1F              0061          INC
0044 C0              0062          AS      0
0045 213F            0063          NI      H'3F'
0047 51              0064          LR      1,A          NEW COUNTS
0048 40              0065          LR      A,0
0049 5C              0066          LR      S,A
004A 66              0067          LISU    6
004B 6A              0068          LISL    2            ADD TO ACCUMULATOR
004C 4C              0069          LR      A,S
004D C1              0070          AS      1
004E 5D              0071          LR      I,A
004F 4C              0072          LR      A,S
0050 19              0073          LNK
0051 5C              0074          LR      S,A
0052 70              0075          CLR
0053 B4              0076          OUTS    4
0054 62              0077          LISU    2            CHECK 20 HZ TIMER
0055 69              0078          LISL    1
0056 20C0            0079          LI      H'C0'        DECREMENT IT
0058 CC              0080          AS      S
0059 5E              0081          LR      D,A
005A 9265       00C0 0082          BNC     TIM20        DONE WITH 12.5 MSEC JOBS
005C 20F0            0083  TIMRET  LI      H'F0'
005E CC              0084          AS      S
005F 5C              0085          LR      S,A          DECR 8 HZ TIMER
0060 14              0086          SR      4
0061 8457       00B9 0087          BZ      TIM3
0063 4B              0088          LR      A,11
0064 0B              0089          LR      IS,A
0065 4A              0090          LR      A,10
0066 1D              0091          LR      W,J
0067 1B              0092          EI
0068 1C              0093          POP
                     0094  *
                     0095  *
0069 207D            0096  CALOP   LI      125
006B B7              0097          OUTS    7
006C 20EB            0098          LI      H'EB'
006E B6              0099          OUTS    6
006F 62              0100          LISU    2
0070 68              0101          LISL    0
0071 20AC            0102          LI      H'AC'
0073 5D              0103          LR      I,A
0074 20C0            0104          LI      H'C0'
0076 5D              0105          LR      I,A
0077 70              0106          CLR
0078 6D              0107          LISL    5
0079 5C              0108          LR      S,A
007A 1F              0109          INC
007B 81FE       007A 0110          BP      *-1
007D A6              0111          INS     6
007E 8121       00A0 0112          BP      EXTINT
0080 2A0FDB 0FDB     0113          DCI     H'FDB'
0083 70              0114          CLR
0084 17              0115          ST
0085 17              0116          ST
0086 62              0117          LISU    2
0087 68              0118          LISL    0
0088 1B              0119          EI
0089 290294 0294     0120          JMP     TSXY
                     0121  *
                     0122  *
                     0123          ORG     H'A0'
00A0 7C              0124  EXTINT  LIS     H'C'
00A1 B0              0125          OUTS    0
```

```
00A2 70              0126           CLR
00A3 B6              0127           OUTS    6
00A4 2A0E7A 0E7A 0128              DCI     MSSHCR           SHORT CIRCUIT
00A7 280DC9 0DC9 0129              PI      MESDIS
00AA 73              0130           LIS     3
00AB 51              0131           LR      1,A
00AC 50              0132           LR      0,A              WAIT 1.5 SECONDS
00AD 32              0133   BLEEP   DS      2
00AE 94FE    00AD 0134              BNZ     BLEEP
00B0 31              0135           DS      1
00B1 94FB    00AD 0136              BNZ     BLEEP
00B3 30              0137           DS      0
00B4 94F8    00AD 0138              BNZ     BLEEP            AND START OVER
00B6 290000  0000 0139              JMP     MAIN
                     0140   *
00B9 20A0            0141   TIM3    LI      H'A0'
00BB CC              0142           AS      S
00BC 5C              0143           LR      S,A
00BD 290141  0141 0144              JMP     TIME8
                     0145   *
00C0 6F              0146   TIM20   LISL    7
00C1 4E              0147           LR      A,D
00C2 15              0148           SL      4
00C3 13              0149           SL      1                AVG 4 PRES READINGS
00C4 13              0150           SL      1
00C5 50              0151           LR      0,A
00C6 4C              0152           LR      A,S
00C7 12              0153           SR      1
00C8 12              0154           SR      1
00C9 C0              0155           AS      0
00CA 50              0156           LR      0,A
00CB 5C              0157           LR      S,A
00CC 68              0158           LISL    0
00CD 78              0159           LIS     8
00CE FC              0160           NS      S                REMOVE OFFSET IF OP MODE
00CF 840A    00DA 0161              BZ      T201
00D1 6B              0162           LISL    3
00D2 4C              0163           LR      A,S              REMOVE OFFSET
00D3 6E              0164           LISL    6
00D4 CC              0165           AS      S
00D5 8202    00D8 0166              BC      *+3
00D7 70              0167           CLR
00D8 5C              0168           LR      S,A
00D9 50              0169           LR      0,A
00DA 65              0170   T201    LISU    5
00DB 6E              0171           LISL    6
00DC 40              0172           LR      A,0
00DD CC              0173           AS      S
00DE 5D              0174           LR      I,A
00DF 4C              0175           LR      A,S
00E0 19              0176           LNK
00E1 5D              0177           LR      I,A
00E2 62              0178           LISU    2
00E3 4C              0179           LR      A,S
00E4 15              0180           SL      4
00E5 8157    013D 0181              BP      T202
00E7 25C0            0182           CI      H'C0'            IN OPERATE; TRIM?
00E9 8453    013D 0183              BZ      T202
00EB 71              0184           LIS     1                NO
00EC F8              0185           NS      8                CHECKSUM OK?
00ED 844F    013D 0186              BZ      T202
00EF A4              0187           INS     4
00F0 2120            0188           NI      H'20'
00F2 844A    013D 0189              BZ      T202             READ S2; OFF?
00F4 A4              0190           INS     4
00F5 13              0191           SL      1
00F6 8105    00FC 0192              BP      T204             FLUSH?
00F8 6A              0193           LISL    2                IN RUN POS
00F9 4C              0194           LR      A,S              TARGET PRESSURE = DSQUARED
00FA 9003    00FE 0195              BR      T205
00FC 2044            0196   T204    LI      68               TARGET PRESSURE = 68 COUNT
00FE 51              0197   T205    LR      1,A
00FF 250B            0198           CI      11
0101 823B    013D 0199              BC      T202             IF TARGET < 12 COUNTS, CLO
0103 40              0200           LR      A,0
0104 2506            0201           CI      6                IF PRESS < 7, OPEN FULL
0106 8232    0139 0202              BC      T206
0108 18              0203           COM
```

```
0109 1F           0204            INC              ERROR = TARGET - PRESSURE
010A C1           0205            AS     1
010B 8424    0130 0206            BZ     ERZR
010D 9225    0133 0207            BNC    T207
010F 50           0208   OPEN     LR     0,A       OPEN VALVE
0110 71           0209            LIS    1
0111 15           0210   VALVE    SL     4
0112 51           0211            LR     1,A       DIR IN R1
0113 40           0212            LR     A,0
0114 18           0213            COM
0115 25BF         0214            CI     H'BF'     LIMIT OF 6 BITS
0117 9202    011A 0215            BNC    VAL1
0119 70           0216            CLR
011A B1           0217   VAL1     OUTS   1         DATA OUT
011B 2040         0218            LI     H'40'
011D B5           0219            OUTS   5
011E 70           0220            CLR
011F B5           0221            OUTS   5
0120 20CF         0222            LI     H'CF'
0122 F8           0223            NS     8
0123 E1           0224            XS     1         SAVE VALVE STATUS
0124 58           0225            LR     8,A
0125 21B8         0226            NI     H'B8'
0127 B0           0227            OUTS   0
0128 70           0228            CLR
0129 B1           0229            OUTS   1
012A 6E           0230            LISL   6
012B 5D           0231            LR     I,A       CLEAR PRESS ACC
012C 5D           0232            LR     I,A
012D 29005C  005C 0233            JMP    TIMRET    DONE WITH 20 HZ TASKS
                  0234   *
0130 50           0235   ERZR     LR     0,A       ZERO ERROR; NO DRIVE
0131 90DF    0111 0236            BR     VALVE
                  0237   *
0133 18           0238   T207     COM              NEG ERROR; CLOSE VALVE
0134 1F           0239            INC
0135 50           0240   CLOSE    LR     0,A
0136 72           0241            LIS    2
0137 90D9    0111 0242            BR     VALVE
0139 203F         0243   T206     LI     H'3F'
013B 90D3    010F 0244            BR     OPEN      FULL OPEN
013D 203F         0245   T202     LI     H'3F'
013F 90F5    0135 0246            BR     CLOSE
                  0247   *
0141 7F           0248   TIMS     LIS    H'F'
0142 FD           0249            NS     I
0143 2504         0250            CI     4
0145 8423    0169 0251            BZ     T8SEZ     SKIP THIS IF DIST CAL
0147 77           0252            LIS    7
0148 FD           0253            NS     I
0149 2A0FE0  0FE0 0254            DCI    H'FE0'
014C 13           0255            SL     1
014D 8E           0256            ADC
014E 66           0257            LISU   6
014F 2C           0258            XDC
0150 2A0FCF  0FCF 0259            DCI    H'FCF'
0153 70           0260            CLR
0154 88           0261            AM
0155 2C           0262            XDC
0156 940B    0162 0263            BNZ    T8LTD     NO ADD IF DIST
0158 A4           0264            INS    4
0159 2120         0265            NI     H'20'     AND SW OFF
015B 9406    0162 0266            BNZ    T8LTD
015D 17           0267            ST
015E 17           0268            ST
015F 6B           0269            LISL   3
0160 9006    0167 0270            BR     T8NDL
0162 4D           0271   T8LTD    LR     A,I
0163 17           0272            ST
0164 4C           0273            LR     A,S
0165 17           0274            ST
0166 70           0275            CLR
0167 5E           0276   T8NDL    LR     D,A
0168 5C           0277            LR     S,A
0169 62           0278   T8SEZ    LISU   2
016A 69           0279            LISL   1
016B 77           0280            LIS    7         RESET PRESS ACC
016C FC           0281            NS     S         ONCE A SECOND
016D 940D    017B 0282            BNZ    T8SEQ
```

```
016F 65            0283           LISU  5
0170 6E            0284           LISL  6
0171 4D            0285           LR    A,I
0172 2A0FFA 0FFA   0286           DCI   H'FFA'
0175 17            0287           ST
0176 4C            0288           LR    A,S
0177 17            0289           ST
0178 70            0290           CLR
0179 5E            0291           LR    D,A
017A 5C            0292           LR    S,A
017B 1B            0293   T8SEQ   EI
017C 62            0294           LISU  2
017D 68            0295           LISL  0
017E A5            0296           INS   5
017F 2120          0297           NI    H'20'
0181 8404 0186     0298           BZ    T8SET       LOOK AT S5 POS
0183 290286 0286   0299           JMP   T8OPER
0186 77            0300   T8SET   LIS   7
0187 FC            0301           NS    S
0188 2502          0302           CI    2
018A 9407 0192     0303           BNZ   T8SE1
018C 6D            0304           LISL  5
018D 70            0305           CLR
018E CC            0306           AS    S
018F 68            0307           LISL  0
0190 9109 019A     0308           BM    T8SE2
0192 2080          0309   T8SE1   LI    H'80'
0194 F8            0310           NS    8
0195 B0            0311           OUTS  0
0196 48            0312           LR    A,8
0197 21F7          0313           NI    H'F7'
0199 58            0314           LR    8,A
019A 4C            0315   T8SE2   LR    A,S         IN SETUP POS
019B 15            0316           SL    4           POS CHGED?
019C 910A 01A7     0317           BM    STFUNC
019E 14            0318           SR    4           NO
019F 52            0319           LR    2,A
01A0 A5            0320           INS   5           S4 CHGED?
01A1 18            0321           COM
01A2 2107          0322           NI    7
01A4 E2            0323           XS    2
01A5 8456 01FC     0324           BZ    T8S2        NOTHING CHGED
01A7 6D            0325   STFUNC  LISL  5           SOMETHING MOVED OUT THERE.
01A8 70            0326           CLR
01A9 5C            0327           LR    S,A         CLEAR ERR FLAGS
01AA 68            0328           LISL  0
01AB A5            0329           INS   5
01AC 18            0330           COM
01AD 2107          0331           NI    7
01AF 52            0332           LR    2,A         LAST.S4 <= S4
01B0 4C            0333           LR    A,S         LAST.S5 <= SETUP
01B1 21F0          0334           NI    H'F0'
01B3 E2            0335           XS    2
01B4 5C            0336           LR    S,A
01B5 280C43 0C43   0337           PI    RAMIN
01B8 6A            0338           LISL  2           LOAD SETUP VALUE
01B9 70            0339           CLR
01BA 8403 01BE     0340           BZ    STF1        SET COLON IF CHSUM BAD
01BC 2080          0341           LI    H'80'
01BE 5C            0342   STF1    LR    S,A
01BF 42            0343           LR    A,2
01C0 2502          0344           CI    2           PRESS OFFSET OK?
01C2 940E 01D1     0345           BNZ   STF9
01C4 2A0FF7 0FF7   0346           DCI   H'FF7'
01C7 16            0347           LM
01C8 88            0348           AM
01C9 88            0349           AM
01CA 2555          0350           CI    H'55'
01CC 8404 01D1     0351           BZ    STF9
01CE 2080          0352           LI    H'80'
01D0 5C            0353           LR    S,A
01D1 6C            0354   STF9    LISL  4
01D2 4C            0355           LR    A,S
01D3 53            0356           LR    3,A
01D4 213F          0357           NI    H'3F'       SAVE DP LOC FOR Q
01D6 5C            0358           LR    S,A
01D7 2A0ED9 0ED9   0359           DCI   DSPTBL      LOAD DISP FORMAT
01DA A5            0360           INS   5
01DB 70            0361           CLR
```

```
01DC 8102   01DF 0362          BP      *+3
01DE 76          0363          LIS     8           SKIP TO METRIC
01DF C2          0364          AS      2
01E0 8E          0365          ADC
01E1 65          0366          LISU    5
01E2 6A          0367          LISL    2
01E3 16          0368          LM                  GET DISP FORMAT
01E4 EC          0369          XS      S
01E5 5C          0370          LR      S,A
01E6 42          0371          LR      A,2
01E7 2503        0372          CI      3           Q SET?
01E9 940D   01F7 0373          BNZ     STF2
01EB 43          0374          LR      A,3
01EC 13          0375          SL      1
01ED 9109   01F7 0376          BM      STF2        IS DP = 2?
01EF A5          0377          INS     5
01F0 74          0378          LIS     4
01F1 9103   01F5 0379          BM      *+4         IF ENGL, ADD 1 TO DP
01F3 20FC        0380          LI      H'FC'       IF METR, SUB 1 FROM DP
01F5 CC          0381          AS      S
01F6 5C          0382          LR      S,A
01F7 280D8F 0D8F 0383  STF2    PI      ENTDC       CONV NUMBER TO DECIMAL
01FA 9017   0212 0384          BR      T8S6        DONE WITH THIS
            0385   *
01FC 6D          0386  T8S2    LISL    5
01FD 2081        0387          LI      H'81'
01FF FC          0388          NS      S           DIST AUTOCAL?
0200 9404   0205 0389          BNZ     T8S3
0202 280A22 0A22 0390          PI      STSLCK      NO; CHECK SET/SELECT
0205 62          0391  T8S3    LISU    2
0206 68          0392          LISL    0
0207 77          0393          LIS     7
0208 FC          0394          NS      S
0209 2504        0395          CI      4           DIST CAL MODE?
020B 6D          0396          LISL    5
020C 841B   0228 0397          BZ      T8S4
020E 2502        0398          CI      2
0210 8404   0215 0399          BZ      T8S41
0212 290639 0639 0400  T8S6    JMP     T8WRAP
            0401   *
0215 A4          0402  T8S41   INS     4
0216 13          0403          SL      1
0217 910D   0225 0404          BM      T842
0219 2082        0405          LI      H'82'       IN FLUSH POS
021B FC          0406          NS      S
021C 2502        0407          CI      2
021E 94F3   0212 0408          BNZ     T8S6        ALREADY GOING
0220 20E4        0409          LI      H'E4'       INITIATE PRES RESET
0222 5C          0410  T843    LR      S,A
0223 90EE   0212 0411          BR      T8S6
0225 72          0412  T842    LIS     2
0226 90FB   0222 0413          BR      T843
            0414   *
0228 A4          0415  T8S4    INS     4           IN DIST CAL MODE
0229 2120        0416          NI      H'20'
022B 8412   023E 0417          BZ      T8S5
022D 73          0418          LIS     3           IN AUTO OR FLUSH
022E FC          0419          NS      S
022F 2502        0420          CI      2           LOOK AT ALLOW.AUTOCAL FLAG
0231 94E0   0212 0421          BNZ     T8S6
0233 4C          0422          LR      A,S
0234 1F          0423          INC                 INITIATE DIST AUTOCAL
0235 5C          0424          LR      S,A
0236 2A0EE9 0EE9 0425          DCI     MESDAS      DISPLAY DASHES
0239 280DC9 0DC9 0426          PI      MESDIS
023C 90D5   0212 0427          BR      T8S6
023E 71          0428  T8S5    LIS     1
023F FC          0429          NS      S           SWITCH OFF
0240 940C   024D 0430          BNZ     T8S7        WAS AUTOCAL IN PROCESS?
0242 4C          0431          LR      A,S         NO
0243 2202        0432          OI      2
0245 5C          0433          LR      S,A         SET ALLOW.AUTOCAL FLAG
0246 66          0434          LISU    6
0247 6A          0435          LISL    2
0248 70          0436          CLR                 ZERO DIST ACCUMULATOR
0249 5D          0437          LR      I,A
```

```
024A 5D              0438            LR     I,A
024B 90C6    0212    0439            BR     T8S6
024D 3C              0440    T8S7    DS     S
024E 66              0441            LISU   6
024F 6A              0442            LISL   2
0250 4D              0443            LR     A,I            DIST AUTOCAL FINISHED
0251 52              0444            LR     2,A            COMPUTE CAL NUMBER
0252 4C              0445            LR     A,S
0253 67              0446            LISU   7
0254 5E              0447            LR     D,A
0255 42              0448            LR     A,2
0256 5E              0449            LR     D,A
0257 6B              0450            LISL   3              NORMALIZE BEFORE DIVISION
0258 280C7A  0C7A    0451            PI     NRM14
025B 66              0452            LISU   6
025C 68              0453            LISL   0
025D 42              0454            LR     A,2
025E 5C              0455            LR     S,A
025F 67              0456            LISU   7
0260 A5              0457            INS    5
0261 2A0EED  0EED    0458            DCI    DSACAL
0264 8103    0268    0459            BP     T8S8
0266 72              0460            LIS    2
0267 8E              0461            ADC
0268 16              0462    T8S8    LM
0269 5D              0463            LR     I,A            LOAD THE CONSTANT
026A 16              0464            LM
026B 5C              0465            LR     S,A
026C 280D47  0D47    0466            PI     DIVBIN
026F 280C7F  0C7F    0467            PI     SHRES          HERE'S THE NUMBER. . .
0272 67              0468            LISU   7
0273 6E              0469            LISL   6
0274 280B75  0B75    0470            PI     MOVTIO         MOVE TO STORE
0277 2A0FCC  0FCC    0471            DCI    H'FCC'
027A 280B7F  0B7F    0472            PI     CKAST
027D 230D8F  0D8F    0473            PI     BNTDC          CONV TO DECIMAL
0280 6A              0474            LISL   2               FOR DISPLAY
0281 70              0475            CLR
0282 5C              0476            LR     S,A            DISPLAY STATUS
0283 290639  0639    0477            JMP    T8WRAP         DONE. . .
                     0478    *
0286 4C              0479    T8OPER  LR     A,S
0287 15              0480            SL     4
0288 810B    0294    0481            BP     T8XY
028A A5              0482            INS    5
028B 18              0483            COM
028C EC              0484            XS     S
028D 2107            0485            NI     7
028F 941E    02AE    0486            BNZ    OPFUNC
0291 290574  0574    0487            JMP    T8O1
0294 20F0            0488    T8XY    LI     H'F0'          S5 MOVED TO OPERATE
0296 FC              0489            NS     S
0297 220C            0490            OI     H'C'           FORCE S4 TO TRIM
0299 5C              0491            LR     S,A             TO FORCE CHECKSUM
029A 2A0FCF  0FCF    0492            DCI    H'FCF'
029D 70              0493            CLR
029E 88              0494            AM
029F 940E    02AE    0495            BNZ    OPFUNC         CLR DIST ACC IF
02A1 64              0496            LISU   4              #NOZ = 0
02A2 6C              0497            LISL   4
02A3 70              0498            CLR
02A4 5D              0499            LR     I,A
02A5 8FFE    02A4    0500            BR7    *-1
02A7 5C              0501            LR     S,A
02A8 2A0FDB  0FDB    0502            DCI    H'FDB'
02AB 17              0503            ST
02AC 17              0504            ST
02AD 62              0505            LISU   2
02AE 6D              0506    OPFUNC  LISL   5
02AF 70              0507            CLR
02B0 5C              0508            LR     S,A            CLEAR ALL ERROR FLAGS
02B1 71              0509            LIS    1
02B2 F8              0510            NS     6
02B3 9404    02B8    0511            BNZ    OPF1           CHECKSUM ALL OK?
02B5 2904C4  04C4    0512            JMP    CKBAD
02B8 68              0513    OPF1    LISL   0              YES
02B9 4C              0514            LR     A,S
```

```
02BA 15           0515         SL     4            NEED TO COMPUTE K?
02BB 25C0         0516         CI     H'C0'        IF MOVED FROM TRIM, YES
02BD 841C   02DA  0517         BZ     KCOMP
02BF A5           0518  OFF3   INS    5            NO K COMP NEEDED
02C0 18           0519         COM
02C1 2107         0520         NI     7
02C3 2208         0521         OI     8            SET LAST.S5 <= OPERATE
02C5 62           0522         LISU   2                LAST.S4 <= S4
02C6 68           0523         LISL   0
02C7 52           0524         LR     2,A
02C8 20F0         0525         LI     H'F0'
02CA FC           0526         NS     S
02CB E2           0527         XS     2
02CC 5C           0528         LR     S,A
02CD 42           0529         LR     A,2          IF TEST SPEED,
02CE 250F         0530         CI     H'F'
02D0 9406   02D7  0531         BNZ    *+7          LOAD DISP FORMAT
02D2 65           0532         LISU   5
02D3 6A           0533         LISL   2
02D4 2014         0534         LI     H'14'
02D6 5C           0535         LR     S,A
02D7 290583 0583  0536         JMP    DCOMP
02DA 2A0FD5 0FD5  0537  KCOMP  DCI    H'FD5'       MEMORY OK
02DD 280E6C 0E6C  0538         PI     LMCD
02E0 73           0539         LIS    3
02E1 52           0540         LR     2,A
02E2 280C43 0C43  0541         PI     RAMIN        LOAD NOZ Q
02E5 6C           0542         LISL   4
02E6 2040         0543         LI     H'40'        CHECK DP OF Q
02E8 FC           0544         NS     S
02E9 66           0545         LISU   6
02EA 6C           0546         LISL   4
02EB 5C           0547         LR     S,A          SAVE FOR LATER
02EC 280CE2 0CE2  0548         PI     MTMPR
02EF 67           0549         LISU   7
                                      LISL   0
02F5 68           0553         
02F6 42           0554         LR     A,2
02F7 5C           0555         LR     S,A          SAVE # SHIFTS
02F8 67           0556         LISU   7
02F9 69           0557         LISL   1
02FA 280C7A 0C7A  0558         PI     NRM14
02FD 280CEC 0CEC  0559         PI     SUBEXP
0300 280D47 0D47  0560         PI     DIVBIN
0303 6E           0561         LISL   6            COMPUTE SPACING FLOW
0304 280C7A 0C7A  0562         PI     NRM14
0307 280CEC 0CEC  0563         PI     SUBEXP
030A 280CF9 0CF9  0564         PI     MRTMCD       MOVE RESULT TO MPCAND
030D 2A0FC3 0FC3  0565         DCI    H'FC3'
0310 280E76 0E76  0566         PI     LMPR
0313 280C5A 0C5A  0567         PI     NRML2
0316 280CEC 0CEC  0568         PI     SUBEXP
0319 280D01 0D01  0569         PI     MULBIN       MULTIPLY
031C 6E           0570         LISL   6
031D 280C7A 0C7A  0571         PI     NRM14
0320 280CEC 0CEC  0572         PI     SUBEXP
0323 2A0FDD 0FDD  0573         DCI    H'FDD'
0326 280E76 0E76  0574         PI     LMPR         LOAD TRIM
0329 6A           0575         LISL   2
032A 4C           0576         LR     A,S
032B 18           0577         COM
032C 24C9         0578         AI     201
032E 5D           0579         LR     I,A
032F 280C7A 0C7A  0580         PI     NRM14
0332 280CF5 0CF5  0581         PI     ADDEXP
0335 280CF9 0CF9  0582         PI     MRTMCD
0338 280D47 0D47  0583         PI     DIVBIN
033B 6E           0584         LISL   6
033C 280C7A 0C7A  0585         PI     NRM14
033F 280CEC 0CEC  0586         PI     SUBEXP
0342 6C           0587         LISL   4
0343 70           0588         CLR
0344 CE           0589         AS     D
0345 8403   0349  0590         BZ     OPE4         LOAD 1 OF 12 FUDGE FACTORS
0347 2012         0591         LI     18           DEPENDING ON Q'S DP
0349 2A0EB5 0EB5  0592  OPE4   DCI    KFUDGE       AND PRESS RANGE
034C 8E           0593         ADC
034D A5           0594         INS    5
034E 2118         0595         NI     H'18'
```

```
0350 12              0596        SR     1
0351 52              0597        LR     2,A
0352 12              0598        SR     1
0353 C2              0599        AS     2
0354 8E              0600        ADC
0355 2806A3 08A3     0601        PI     LDMPR
0358 280CF9 0CF9     0602        PI     MRTMCD
035B 280D01 0D01     0603        PI     MULBIN
035E 6E              0604        LISL   6
035F 280C7A 0C7A     0605        PI     NRM14
0362 280CEC 0CEC     0606        PI     SUBEXP
0365 67              0607        LISU   7
0366 6E              0608        LISL   6
0367 4E              0609        LR     A,D
0368 52              0610        LR     2,A
0369 4E              0611        LR     A,D          SAVE RESULT FOR GPA/F COMP
036A 63              0612        LISU   3
036B 5D              0613        LR     I,A
036C 42              0614        LR     A,2
036D 5C              0615        LR     S,A
036E 66              0616        LISU   6
036F 68              0617        LISL   0
0370 4D              0618        LR     A,I          SAVE EXP VALUE
0371 5C              0619        LR     S,A          IN R61
0372 67              0620        LISU   7
0373 6E              0621        LISL   6
0374 280C5A 0C5A     0622        PI     NRMLZ
0377 280CEC 0CEC     0623        PI     SUBEXP
037A 2A0FC0 0FC0     0624        DCI    H'FC0'
037D 280E76 0E76     0625        PI     LMPR         LOAD GPA SET
0380 280C5A 0C5A     0626        PI     NRMLZ
0383 280CEC 0CEC     0627        PI     SUBEXP
0386 280CF9 0CF9     0628        PI     MRTMCD
0389 280D01 0D01     0629        PI     MULBIN       HERE'S THE RESULT
038C 280C7F 0C7F     0630        PI     SHRES        SHIFT RESULT TO CORRECT VAL
038F 67              0631        LISU   7
0390 6D              0632        LISL   5
0391 4D              0633        LR     A,I
0392 52              0634        LR     2,A
0393 4E              0635        LR     A,D
0394 53              0636        LR     3,A
0395 66              0637        LISU   6
0396 5E              0638        LR     D,A
0397 42              0639        LR     A,2
0398 5E              0640        LR     D,A
0399 A5              0641        INS    5
039A 67              0642        LISU   7
039B 68              0643        LISL   0
039C 20CD            0644        LI     H'CD'        ENGL/METR
039E 8103    03A2    0645        BP     *+4
03A0 2099            0646        LI     H'99'        METRIC CORRECTION
03A2 5D              0647        LR     I,A
03A3 7C              0648        LIS    H'C'
03A4 8103    03A8    0649        BP     *+4
03A6 2014            0650        LI     H'14'
03A8 5C              0651        LR     S,A
03A9 2806D6 08D6     0652        PI     MRTMPR
03AC 6B              0653        LISL   3
03AD 280C7A 0C7A     0654        PI     NRM14
03B0 66              0655        LISU   6
03B1 68              0656        LISL   0
03B2 42              0657        LR     A,2
03B3 24FC            0658        AI     -4
03B5 5C              0659        LR     S,A
03B6 280D47 0D47     0660        PI     DIVBIN
03B9 280C7F 0C7F     0661        PI     SHRES        NOW SAVE FUDGE/K
03BC 67              0662        LISU   7
03BD 6E              0663        LISL   6
03BE 4E              0664        LR     A,D
03BF 52              0665        LR     2,A
03C0 4C              0666        LR     A,S
03C1 63              0667        LISU   3
03C2 6A              0668        LISL   2
03C3 5D              0669        LR     I,A
03C4 42              0670        LR     A,2
03C5 5C              0671        LR     S,A
```

```
03C6 71              0672         LIS   1
03C7 55              0673         LR    5,A       SET UP TO DO TWICE
03C8 72              0674         LIS   2         LO PRESS FIRST
03C9 52              0675  SPR5   LR    2,A
03CA 280C43 0C43     0676         PI    RAMIN     LOAD HI/LO LIMIT
03CD 280CD4 0CD4     0677         PI    MTMCD
03D0 68              0678         LISL  0         SHIFT LEFT ONCE
03D1 4C              0679         LR    A,S
03D2 CC              0680         AS    S
03D3 5D              0681         LR    I,A
03D4 4C              0682         LR    A,S
03D5 19              0683         LNK
03D6 CC              0684         AS    S
03D7 5D              0685         LR    I,A
03D8 2A0EF1 0EF1     0686         DCI   PFUDGE    CONV READING TO COUNTS
03DB A5              0687         INS   5         ONE OF 6 FACTORS
03DC 2118            0688         NI    H'18'
03DE 12              0689         SR    1
03DF 8E              0690         ADC
03E0 A5              0691         INS   5
03E1 8103 03E5       0692         BP    PT1
03E3 72              0693         LIS   2
03E4 8E              0694         ADC
03E5 16              0695  PT1    LM
03E6 5D              0696         LR    I,A
03E7 16              0697         LM
03E8 5C              0698         LR    S,A
03E9 280D01 0D01     0699         PI    MULBIN
03EC 6E              0700         LISL  6
03ED 70              0701         CLR
03EE CE              0702         AS    D
03EF 8404 03F4       0703         BZ    NOEXD
03F1 20CC            0704         LI    H'CC'
03F3 5C              0705         LR    S,A
03F4 4C              0706  NOEXD  LR    A,S
03F5 25CC            0707         CI    H'CC'
03F7 8204 03FC       0708         BC    *+5
03F9 20CC            0709         LI    H'CC'
03FB 5C              0710         LR    S,A
03FC 71              0711         LIS   1
03FD F5              0712         NS    5          HI OR LO?
03FE 840A 0409       0713         BZ    SPR6
0400 20FD            0714         LI    H'FD'      LO
0402 CC              0715         AS    S
0403 8202 0406       0716         BC    *+3
0405 71              0717         LIS   1
0406 6F              0718         LISL  7          1 PSI (MED RANGE) BELOW
0407 9008 0410       0719         BR    SPR7
0409 73              0720  SPR6   LIS   3
040A CC              0721         AS    S          1 PSI (MED RANGE) ABOVE
040B 9203 040F       0722         BNC   *+4
040D 20FF            0723         LI    H'FF'
040F 6E              0724         LISL  6
0410 66              0725  SPR7   LISU  6
0411 5C              0726         LR    S,A        SAVE LIMITS
0412 280CA9 0CA9     0727         PI    SQRP       COMPUTE SQR
0415 63              0728         LISU  3
0416 6A              0729         LISL  2
0417 4D              0730         LR    A,I        LOAD FUDGE/K
0418 52              0731         LR    2,A
0419 4C              0732         LR    A,S
041A 67              0733         LISU  7
041B 5E              0734         LR    D,A
041C 42              0735         LR    A,2
041D 5C              0736         LR    S,A
041E 280D01 0D01     0737         PI    MULBIN     COMPUTE SQR(P)/K
0421 6D              0738         LISL  5
0422 4C              0739         LR    A,S
0423 65              0740         LISU  5
0424 6B              0741         LISL  3
0425 2563            0742         CI    99
0427 8203 042B       0743         BC    *+4        LIMIT TO 99 MPH/KPH
0429 2063            0744         LI    99
042B 5D              0745         LR    I,A
042C 70              0746         CLR
042D 5C              0747         LR    S,A
042E 280D8F 0D8F     0748         PI    BNTDC      CONV TO BCD
0431 68              0749         LISL  0
```

```
0432 4C              0750            LR    A,S
0433 52              0751            LR    2,A
0434 71              0752            LIS   1
0435 F5              0753            NS    5                   WHERE TO STORE?
0436 42              0754            LR    A,2
0437 63              0755            LISU  3
0438 8408   0441     0756            BZ    SPR4
043A 69              0757            LISL  1
043B 5C              0758            LR    S,A
043C 72              0759            LIS   2
043D 55              0760            LR    5,A                 DO HI PRESS NOW
043E 76              0761            LIS   6
043F 9089   03C9     0762            BR    SPR5
0441 68              0763   SPR4     LISL  0
0442 5C              0764            LR    S,A                 ALL DONE NOW
0443 6C              0765            LISL  4                   NOW COMPUTE GPA/K
0444 4D              0766            LR    A,I
0445 52              0767            LR    2,A
0446 4C              0768            LR    A,S
0447 6B              0769            LISL  3
0448 67              0770            LISU  7
0449 5E              0771            LR    D,A
044A 42              0772            LR    A,2
044B 5C              0773            LR    S,A
044C 66              0774            LISU  6
044D 69              0775            LISL  1                   RESTORE EXP
044E 4E              0776            LR    A,D
044F 18              0777            COM
0450 1F              0778            INC
0451 5C              0779            LR    S,A
0452 2A0EFD 0EFD     0780            DCI   GFUDGE
0455 280B92 0B92     0781            PI    LDMPCD              LOAD FUDGE AND EXP
0458 280D47 0D47     0782            PI    DIVBIN
045B 280C7F 0C7F     0783            PI    SHRES
045E 2A0FF0 0FF0     0784            DCI   H'FF0'
0461 67              0785            LISU  7
0462 6D              0786            LISL  5
0463 4D              0787            LR    A,I
0464 17              0788            ST
0465 4D              0789            LR    A,I
0466 17              0790            ST
0467 2A0FCF 0FCF     0791            DCI   H'FCF'
046A 280E6C 0E6C     0792            PI    LMCD
046D 280C5A 0C5A     0793            PI    NRMLZ               # NOZZLES
0470 66              0794            LISU  6
0471 68              0795            LISL  0
0472 42              0796            LR    A,2
0473 18              0797            COM
0474 1F              0798            INC
0475 5C              0799            LR    S,A
0476 2A0FD5 0FD5     0800            DCI   H'FD5'              GET SPACING
0479 280E76 0E76     0801            PI    LMPR
047C 280C5A 0C5A     0802            PI    NRMLZ
047F 280CEC 0CEC     0803            PI    SUBEXP
0482 280D01 0D01     0804            PI    MULBIN
0485 280CF9 0CF9     0805            PI    MRTMCD
0488 2A0F03 0F03     0806            DCI   ARFDGE
048B 280BA3 0BA3     0807            PI    LDMPR               E/M FUDGE AGAIN...
048E 280D01 0D01     0808            PI    MULBIN
0491 280C7F 0C7F     0809            PI    SHRES
0494 67              0810            LISU  7
0495 6D              0811            LISL  5
0496 2A0FF2 0FF2     0812            DCI   H'FF2'
0499 4D              0813            LR    A,I
049A 17              0814            ST
049B 4C              0815            LR    A,S
049C 17              0816            ST
049D 70              0817            CLR
049E 62              0818            LISU  2
049F 6E              0819            LISL  6
04A0 5D              0820            LR    I,A                 CLEAR ALL ACC'S
04A1 5D              0821            LR    I,A
04A2 64              0822            LISU  4
04A3 5D              0823            LR    I,A
04A4 5C              0824            LR    S,A
04A5 6C              0825            LISL  4
04A6 5D              0826            LR    I,A
04A7 5D              0827            LR    I,A
```

```
04A8 65            0828           LISU  5
04A9 5D            0829           LR    I,A
04AA 5C            0830           LR    S,A
04AB 66            0831           LISU  6
04AC 6A            0832           LISL  2
04AD 5D            0833           LR    I,A
04AE 5C            0834           LR    S,A
04AF 2A0FFC 0FFC  0835           DCI   H'FFC'
04B2 17            0836           ST
04B3 17            0837           ST
04B4 17            0838           ST
04B5 17            0839           ST
04B6 2A0FCC 0FCC  0840           DCI   H'FCC'
04B9 64            0841           LISU  4
04BA 6A            0842           LISL  2
04BB 16            0843           LM
04BC 5D            0844           LR    I,A
04BD 203F          0845           LI    H'3F'
04BF 8A            0846           NM
04C0 5C            0847           LR    S,A
04C1 2902BF 02BF  0848           JMP   OPF3
                   0849     *
04C4 70            0850  CKBAD    CLR                  CKSUM NOT OK YET
04C5 57            0851           LR    7,A
04C6 77            0852           LIS   7
04C7 52            0853           LR    2,A             CHECK ALL SETUP VALUES
04C8 280C43 0C43  0854  CKB1     PI    RAMIN
04CB 8403   04CF  0855           BZ    CKB2
04CD 71            0856           LIS   1               ERROR FOUND
04CE 57            0857           LR    7,A
04CF 32            0858  CKB2     DS    2
04D0 82F7   04C8  0859           BC    CKB1
04D2 2A0FD8 0FD8  0860           DCI   H'FD8'
04D5 280C4B 0C4B  0861           PI    INDATA
04D8 6B            0862           LISL  3
04D9 840C   04E6  0863           BZ    CKB3
04DB 2A0FD8 0FD8  0864           DCI   H'FD8'
04DE 70            0865           CLR
04DF 1A            0866           DI
04E0 17            0867           ST
04E1 17            0868           ST
04E2 2055          0869           LI    H'55'
04E4 17            0870           ST
04E5 1B            0871           EI
04E6 4D            0872  CKB3     LR    A,I             PUT IN SCRATCHPAD
04E7 52            0873           LR    2,A
04E8 4C            0874           LR    A,S
04E9 64            0875           LISU  4
04EA 6F            0876           LISL  7
04EB 5E            0877           LR    D,A
04EC 42            0878           LR    A,2
04ED 5C            0879           LR    S,A
04EE 2A0FF7 0FF7  0880           DCI   H'FF7'          CHECK PRESSURE OFFSET
04F1 280C4B 0C4B  0881           PI    INDATA
04F4 8403   04F8  0882           BZ    CKB4
04F6 71            0883           LIS   1
04F7 57            0884           LR    7,A
04F8 6B            0885  CKB4     LISL  3
04F9 4C            0886           LR    A,S
04FA 18            0887           COM
04FB 1F            0888           INC                   SAVE IT
04FC 62            0889           LISU  2
04FD 6B            0890           LISL  3
04FE 5C            0891           LR    S,A
04FF 2A0FDD 0FDD  0892           DCI   H'FDD'          CHECK TRIM
0502 280C4B 0C4B  0893           PI    INDATA
0505 8410   0516  0894           BZ    CKB5
0507 2A0FDD 0FDD  0895           DCI   H'FDD'
050A 2064          0896           LI    H'64'
050C 1A            0897           DI
050D 17            0898           ST
050E 70            0899           CLR
050F 17            0900           ST
0510 20F1          0901           LI    H'F1'
0512 17            0902           ST
0513 1B            0903           EI
0514 71            0904           LIS   1
0515 57            0905           LR    7,A
```

```
0516 2A0FF4 0FF4 0906 CKB5    DCI   H'FF4'    TEST SPEED
0519 280C4B 0C4B 0907         PI    INDATA
051C 8403      0520 0908      BZ    CKB6
051E 71             0909      LIS   1
051F 57             0910      LR    7,A
0520 2A0FCC 0FCC 0911 CKB6    DCI   H'FCC'
0523 64             0912      LISU  4
0524 6A             0913      LISL  2
0525 16             0914      LM
0526 5D             0915      LR    1,A
0527 16             0916      LM
0528 5C             0917      LR    S,A
0529 70             0918      CLR
052A E7             0919      AS    7          DID WE MAKE IT??
052B 9409      0535 0920      BNZ   CKB7       YES! SET OK FLAG
052D 48             0921      LR    A,8
052E 2201           0922      OI    1
0530 58             0923      LR    8,A
0531 62             0924      LISU  2
0532 2902AE 02AE 0925         JMP   OFFUNC     AND TRY AGAIN
0535 A5             0926 CKB7 INS   5
0536 18             0927      COM
0537 2107           0928      NI    7          CKSUM BAD
0539 2507           0929      CI    7
053B 8412      054E 0930      BZ    CKB8       TEST SPEED?
053D 2504           0931      CI    4
053F 840E      054E 0932      BZ    CKB8       TRIM?
0541 62             0933      LISU  2
0542 6D             0934      LISL  5
0543 74             0935      LIS   4          NO; FAIL MESSAGE AND ALARM
0544 5C             0936      LR    S,A
0545 2A0E7E 0E7E 0937         DCI   MSFAIL
0548 280DC9 0DC9 0938         PI    MESDIS
054B 2902BF 02BF 0939         JMP   OPF3
054E 2504           0940 CKB8 CI    4
0550 52             0941      LR    2,A
0551 2A0FDD 0FDD 0942         DCI   H'FDD'
0554 8404      0559 0943      BZ    CKB9
0556 2A0FF4 0FF4 0944         DCI   H'FF4'
0559 280C4B 0C4B 0945 CKB9    PI    INDATA     LOAD VALUE
055C 6A             0946      LISL  2
055D 70             0947      CLR
055E 8403      0562 0948      BZ    CKB10      SET COLON?
0560 2080           0949      LI    H'80'      YES
0562 5C             0950 CKB10 LR   S,A
0563 42             0951      LR    A,2
0564 2504           0952      CI    4
0566 8408      056F 0953      BZ    CKB11
0568 4C             0954      LR    A,S        TEST SPEED
0569 2214           0955      OI    H'14'
056B 5C             0956      LR    S,A        DISPLAY STATUS
056C 2902BF 02BF 0957 CKB12   JMP   OPF3
056F 280BBD 0BBD 0958 CKB11   PI    TRIMD
0572 90F9      056C 0959      BR    CKB12
                   0960 *
0574 A5             0961 TS01 INS   5
0575 18             0962      COM                SET/SEL CHECK IF
0576 2107           0963      NI    7            AREA,TRIM, TEST SPEED
0578 2504           0964      CI    4
057A 8405      0580 0965      BZ    TSP1
057C 2505           0966      CI    5
057E 8204      0583 0967      BC    DCOMP
0580 280A22 0A22 0968 TSP1    PI    STSLCK
0583 2A0FCF 0FCF 0969 DCOMP   DCI   H'FCF'     USE ACT DIST IF DIST MODE
0586 70             0970      CLR
0587 88             0971      AM
0588 8432      05BB 0972      BZ    DC02       COMPUTE NEW D.SQUARED
058A A5             0973      INS   5
058B 18             0974      COM
058C 2107           0975      NI    7
058E 2505           0976      CI    5
0590 8405      0596 0977      BZ    DC01       TEST SPEED OR TEST PRESSUR
0592 2507           0978      CI    7
0594 9426      05BB 0979      BNZ   DC02       YES
0596 2A0FF4 0FF4 0980 DC01    DCI   H'FF4'
0599 280E6C 0E6C 0981         PI    LMCD
059C 4C             0982      LR    A,S        MPY BY 16
059D 15             0983      SL    4
```

```
059E 5E              0984           LR    D,A
059F 4D              0985           LR    A,I
05A0 14              0986           SR    4
05A1 EC              0987           XS    S
05A2 5E              0988           LR    D,A
05A3 4C              0989           LR    A,S
05A4 15              0990           SL    4
05A5 5C              0991           LR    S,A
05A6 2A0F33 0F33     0992           DCI   SPCONV
05A9 A5              0993           INS   5
05AA 8103     05AE   0994           BP    *+4
05AC 72              0995           LIS   2
05AD 8E              0996           ADC
05AE 6A              0997           LISL  2
05AF 16              0998           LM
05B0 5D              0999           LR    I,A
05B1 16              1000           LM
05B2 5C              1001           LR    S,A
05B3 280D01 0D01     1002           PI    MULBIN    TO GET 40 COUNTS/MPH
05B6 280CF9 0CF9     1003           PI    MRTMCD
05B9 9038     05F2   1004           BR    DCO3
05BB 2A0FE0 0FE0     1005   DC02    DCI   H'FE0'    USE ACTUAL DIST COUNTS
05BE 78              1006           LIS   8
05BF 57              1007           LR    7,A
05C0 67              1008           LISU  7
05C1 68              1009           LISL  0
05C2 70              1010           CLR
05C3 5D              1011           LR    I,A
05C4 5E              1012           LR    D,A
05C5 16              1013   DC04    LM
05C6 CC              1014           AS    S
05C7 5D              1015           LR    I,A
05C8 16              1016           LM
05C9 19              1017           LNK
05CA CC              1018           AS    S
05CB 5E              1019           LR    D,A
05CC 37              1020           DS    7
05CD 94F7     05C5   1021           BNZ   DC04
05CF 69              1022           LISL  1
05D0 280C5A 0C5A     1023           PI    NRMLZ     AND NORMALIZE
05D3 42              1024           LR    A,2
05D4 18              1025           COM
05D5 2406            1026           AI    6         CONVERT TO
05D7 66              1027           LISU  6         CAL DISTANCE
05D8 68              1028           LISL  0
05D9 5C              1029           LR    S,A
05DA 64              1030           LISU  4
05DB 6A              1031           LISL  2
05DC 4D              1032           LR    A,I       LOAD DIST CAL #
05DD 52              1033           LR    2,A
05DE 4C              1034           LR    A,S
05DF 67              1035           LISU  7
05E0 5E              1036           LR    D,A
05E1 42              1037           LR    A,2
05E2 5D              1038           LR    I,A
05E3 280C5A 0C5A     1039           PI    NRMLZ
05E6 290CEC 0CEC     1040           PI    SUBEXP
05E9 280D01 0D01     1041           PI    MULBIN
05EC 280C7F 0C7F     1042           PI    SHRES
05EF 280CF9 0CF9     1043           PI    MRTMCD
05F2 69              1044   DC03    LISL  1         SAVE CAL DIST COUNTS
05F3 67              1045   DCY1    LISU  7
05F4 4C              1046           LR    A,S
05F5 64              1047           LISU  4
05F6 5E              1048           LR    D,A
05F7 8FFB     05F3   1049           BR7   DCY1
05F9 66              1050           LISU  6
05FA 6C              1051           LISL  4         LOAD K
05FB 4D              1052           LR    A,I
05FC 52              1053           LR    2,A
05FD 4C              1054           LR    A,S
05FE 67              1055           LISU  7
05FF 6B              1056           LISL  3
0600 5E              1057           LR    D,A
0601 42              1058           LR    A,2
0602 5C              1059           LR    S,A
0603 66              1060           LISU  6
0604 68              1061           LISL  0
```

```
0605 78              1062           LIS    8
0606 5C              1063           LR     S,A
0607 67              1064           LISU   7
0608 6B              1065           LISL   3
0609 280C5A 0C5A     1066           PI     NRMLZ
060C 280CEC 0CEC     1067           PI     SUBEXP
060F 67              1068           LISU   7
0610 69              1069           LISL   1
0611 280C5A 0C5A     1070           PI     NRMLZ
0614 280CEC 0CEC     1071           PI     SUBEXP
0617 280D01 0D01     1072           PI     MULBIN    COMPUTE K * DIST
061A 280C7F 0C7F     1073           PI     SHRES
061D 280CF9 0CF9     1074           PI     MRTMCD    SQUARE RESULT
0620 280BD6 0BD6     1075           PI     MRTMPR
0623 280D01 0D01     1076           PI     MULBIN
0626 2A0FCF 0FCF     1077           DCI    H'FCF'    IF DIST MODE D.S = 0
0629 70              1078           CLR
062A 88              1079           AM
062B 840A   0636     1080           BZ     DCL1X
                                                    HERE'S D.SQUARED
062D 67              1081           LISU   7
062E 6E              1082           LISL   6
062F 70              1083           CLR
0630 CE              1084           AS     D         IF > FF, CALL IT FF
0631 20FF            1085           LI     H'FF'
0633 9402   0636     1086           BNZ    DCL1X
0635 4C              1087           LR     A,S
0636 62              1088  DCL1X    LISU   2
0637 6A              1089           LISL   2
0638 5C              1090           LR     S,A
0639 62              1091  T8WRAP   LISU   2         END OF 8 HZ TASKS
063A 69              1092           LISL   1            FINALLY...
063B 3C              1093           DS     S
063C 4C              1094           LR     A,S       DECR 1 HZ TIMER
063D 213F            1095           NI     H'3F'
063F 9405   0645     1096           BNZ    T8W1
0641 4C              1097           LR     A,S
0642 2230            1098           OI     H'30'     RESET IT
0644 5C              1099           LR     S,A
0645 2101            1100  T8W1     NI     1
0647 94FF   0647     1101           BNZ    *         WAIT FOR ACTION
0649 68              1102  TIME4    LISL   0
064A 4C              1103           LR     A,S       4 HZ TASKS
064B 15              1104           SL     4
064C 9108   0655     1105           BM     T41
064E 6D              1106           LISL   5         IN SETUP MODE
064F 71              1107           LIS    1
0650 FC              1108           NS     S         IN DIST AUTOCAL?
0651 9438   068A     1109           BNZ    T42
0653 9009   065D     1110           BR     T43
0655 25C0            1111  T41      CI     H'C0'     TRIM MODE?
0657 8405   065D     1112           BZ     T43
0659 25F0            1113           CI     H'F0'     TEST SPEED?
065B 942E   068A     1114           BNZ    T42
065D 69              1115  T43      LISL   1
065E 73              1116           LIS    3
065F FC              1117           NS     S
0660 941F   0680     1118           BNZ    T44       HALF-SEC TASKS
0662 A4              1119           INS    4
0663 2110            1120           NI     H'10'
0665 9407   066D     1121           BNZ    T45       SET OFF
0667 20FD            1122           LI     H'FD'
0669 F8              1123           NS     8
066A 58              1124           LR     8,A
066B 900D   0679     1125           BR     T46       SET ON
066D 72              1126  T45      LIS    2
066E F8              1127           NS     8
066F 8406   0676     1128           BZ     T47       SET.HELD?
0671 280A7A 0A7A     1129           PI     INCDIG
0674 9004   0679     1130           BR     T46
                     1131  *
0676 72              1132  T47      LIS    2         TOGGLE DIG.SET.HELD
0677 E8              1133           XS     8
0678 58              1134           LR     8,A
0679 65              1135  T46      LISU   5         UN-BLANK SELECTED DIGIT
067A 6A              1136           LISL   2
067B 20BF            1137           LI     H'BF'
067D FC              1138           NS     S
067E 900A   0689     1139           BR     T48
```

```
0680 72            1140  T44   LIS    2
0681 F8            1141        NS     8
0682 94F6  0679    1142        BNZ    T46        DIG.SET.HELD?
0684 65            1143        LISU   5
0685 6A            1144        LISL   2          NO
0686 4C            1145        LR     A,S
0687 2240          1146        OI     H'40'
0689 5C            1147  T48   LR     S,A        BLANK SELECTED DIGIT
068A 62            1148  T42   LISU   2
068B 69            1149        LISL   1
068C 77            1150        LIS    7
068D FE            1151        NS     D          1 SEC TASKS?
068E 944F  06DE    1152        BNZ    T49
0690 4C            1153        LR     A,S
0691 15            1154        SL     4
0692 810C  069F    1155        BP     T51
0694 25C0          1156        CI     H'C0'      OPERATES TRIM?
0696 8447  06DE    1157        BZ     T49
0698 71            1158        LIS    1          CHKSUM OK?
0699 F8            1159        NS     8
069A 8443  06DE    1160        BZ     T49
069C 29078F 078F   1161        JMP    TIME1      DO 1 SEC JOBS
069F 2520          1162  T51   CI     H'20'      LO PRESS?
06A1 943C  06DE    1163        BNZ    T49
06A3 6D            1164        LISL   5
06A4 70            1165        CLR
06A5 CC            1166        AS     S
06A6 8137  06DE    1167        BP     T49
06A8 20F0          1168        LI     H'F0'      PRESS OFFSET IN PROGRESS
06AA CC            1169        AS     S          DECR COUNTER
06AB 5C            1170        LR     S,A
06AC 2170          1171        NI     H'70'
06AE 2510          1172        CI     H'10'
06B0 942D  06DE    1173        BNZ    T49
06B2 70            1174        CLR
06B3 5C            1175        LR     S,A
06B4 280BE1 0BE1   1176        PI     PRCONV     STORE PRESS OFFSET
06B7 67            1177        LISU   7
06B8 6D            1178        LISL   5
06B9 4D            1179        LR     A,I
06BA 2A0FF7 0FF7   1180        DCI    H'FF7'
06BD 1A            1181        DI
06BE 17            1182        ST
06BF 53            1183        LR     3,A
06C0 4E            1184        LR     A,D
06C1 17            1185        ST
06C2 C3            1186        AS     3
06C3 18            1187        COM
06C4 2456          1188        AI     H'56'
06C6 17            1189        ST
06C7 1B            1190        EI
06C8 4C            1191        LR     A,S
06C9 62            1192        LISU   2          STORE IN RAM AND R 23
06CA 6B            1193        LISL   3
06CB 18            1194        COM
06CC 1F            1195        INC
06CD 5C            1196        LR     S,A
06CE 2A0FC6 0FC6   1197        DCI    H'FC6'
06D1 16            1198        LM                CLR COLON IF LO
06D2 88            1199        AM                PRESS CKSUM OK
06D3 88            1200        AM
06D4 2555          1201        CI     H'55'
06D6 9407  06DE    1202        BNZ    T49
06D8 65            1203        LISU   5          CLEAR COLON
06D9 6A            1204        LISL   2
06DA 4C            1205        LR     A,S
06DB 13            1206        SL     1
06DC 12            1207        SR     1
06DD 5C            1208        LR     S,A
06DE 62            1209  T49   LISU   2          DISP UPDATE
06DF 6D            1210        LISL   5
06E0 71            1211        LIS    1          NONE IF ERR OR DIST AUTOCA
06E1 FC            1212        NS     S
06E2 944B  072E    1213        BNZ    T410       NO DISP IF ERR AND ODD SECO
06E4 7C            1214        LIS    H'C'
06E5 FC            1215        NS     S
06E6 840D  06F4    1216        BZ     TDSP
```

```
06E8 2504        1217           CI    4          NO UPDATE IF FAIL
06EA 8443  072E  1218           BZ    T410
06EC 69          1219           LISL  1
06ED 4C          1220           LR    A,S
06EE 24FF        1221           AI    H'FF'
06F0 2108        1222           NI    8
06F2 943B  072E  1223           BNZ   T410
06F4 68          1224    TDSP   LISL  0          UPDATE THE DISPLAY
06F5 4C          1225           LR    A,S        GET S5 AND S4 SETTING
06F6 15          1226           SL    4
06F7 8133  072B  1227           BP    T411
06F9 52          1228           LR    2,A
06FA 2A0FCF 0FCF 1229           DCI   H'FCF'     IF OP AND WHOI = 0
06FD 70          1230           CLR              THEN DISP DIST
06FE 88          1231           AM
06FF 843D  073D  1232           BZ    TDS9
0701 42          1233           LR    A,2
0702 25C0        1234           CI    H'C0'      TRIM?
0704 8459  075E  1235           BZ    T412
0706 25F0        1236           CI    H'F0'
0708 845A  0763  1237           BZ    T413       IN OPERATE MODE; DO IT
070A 77          1238           LIS   7
070B FC          1239           NS    S
070C 2A0F09 0F09 1240           DCI   VALLOC     PT TO VALUE LOCATION
070F 8E          1241           ADC
0710 16          1242           LM
0711 0B          1243           LR    IS,A
0712 4D          1244           LR    A,I
0713 52          1245           LR    2,A        MOVE TO DISP REG
0714 4C          1246           LR    A,S
0715 65          1247           LISU  5
0716 69          1248           LISL  1
0717 5E          1249           LR    D,A
0718 42          1250           LR    A,2
0719 5C          1251           LR    S,A
071A 2A0F11 0F11 1252           DCI   DSTBL      GET DISP FORMAT
071D A5          1253           INS   5
071E 8102  0721  1254           BP    *+3
0720 16          1255           LM
0721 62          1256           LISU  2
0722 68          1257           LISL  0
0723 77          1258           LIS   7
0724 FC          1259           NS    S
0725 13          1260           SL    1
0726 8E          1261           ADC
0727 16          1262           LM
0728 65          1263           LISU  5
0729 6A          1264           LISL  2
072A 5C          1265           LR    S,A        DONE UPDATING DISPLAY
072B 280DF8 0DF8 1266    T411   PI    DISP
072E 62          1267    T410   LISU  2
072F 6D          1268           LISL  5
0730 7C          1269           LIS   H'C'
0731 FC          1270           NS    S          UPDATE ALARM STATUS
0732 9419  074C  1271           BNZ   ALR1
0734 20F7        1272    ALR5   LI    H'F7'      OFF
0736 F8          1273           NS    8
0737 58          1274    ALR3   LR    8,A
0738 21B8        1275           NI    H'B8'
073A B0          1276           OUTS  0
073B 90FF  073B  1277           BR    *          AND THAT IS IT FOR NOW
073D 64          1278    TDS9   LISU  4          DISP DIST NO MATTER WHAT
073E 6F          1279           LISL  7
073F 4E          1280           LR    A,D
0740 52          1281           LR    2,A
0741 4C          1282           LR    A,S
0742 65          1283           LISU  5
0743 68          1284           LISL  0
0744 5D          1285           LR    I,A
0745 42          1286           LR    A,2
0746 5D          1287           LR    I,A
0747 2030        1288           LI    H'30'
0749 5C          1289           LR    S,A
074A 90E0  072B  1290           BR    T411
074C 2104        1291    ALR1   NI    4          SOMETHING SET
074E 8406  0755  1292           BZ    ALR2
0750 48          1293    ALR4   LR    A,8
0751 2208        1294           OI    8
```

```
0753 90E3    0737 1295          BR     ALR3
0755 69           1296   ALR2   LISL   1              PRESS ERROR
0756 76           1297          LIS    6
0757 FC           1298          NS     S
0758 2502         1299          CI     2              ON FOR 1/4 SEC
075A 84F5    075C 1300          BZ     ALR4
075C 90D7    0734 1301          BR     ALR5
                 1302   *
075E 2808BD  08BD 1303   T412   PI     TRIMD          LOAD TRIM VALUE
0761 90C9    072B 1304          BR     T411
0763 2A0FF4  0FF4 1305   T413   DCI    H'FF4'         LOAD TEST SPEED
0766 280C4B  0C4B 1306          PI     INDATA
0769 70           1307          CLR
076A 8403    076E 1308          BZ     *+4            CHKSUM OK?
076C 2080         1309          LI     H'80'
076E 52           1310          LR     2,A
076F 72           1311          LIS    2
0770 F8           1312          NS     8              DIG SET HELD?
0771 70           1313          CLR
0772 9409    077C 1314          BNZ    T414
0774 62           1315          LISU   2
0775 69           1316          LISL   1              BLINK SELECTED DIGIT?
0776 72           1317          LIS    2
0777 FC           1318          NS     S
0778 8403    077C 1319          BZ     T414
077A 2040         1320          LI     H'40'
077C C2           1321   T414   AS     2
077D 52           1322          LR     2,A
077E 65           1323          LISU   5
077F 6A           1324          LISL   2
0780 203F         1325          LI     H'3F'
0782 FC           1326          NS     S
0783 E2           1327          XS     2
0784 5C           1328          LR     S,A
0785 6C           1329          LISL   4              REMOVE DP
0786 4C           1330          LR     A,S
0787 213F         1331          NI     H'3F'
0789 5C           1332          LR     S,A
078A 280D8F  0D8F 1333          PI     BNTDC
078D 909D    072B 1334          BR     T411
                 1335   *
078F 62           1336   TIME1  LISU   2
0790 68           1337          LISL   0              SKIP SPEED READOUT IF TEST
0791 7F           1338          LIS    H'F'
0792 FC           1339          NS     S
0793 250F         1340          CI     H'F'
0795 843D    07D3 1341          BZ     TI14           ONE-SEC MONITORING COMPUTA
0797 69           1342          LISL   1
0798 64           1343   TI11   LISU   4
0799 4C           1344          LR     A,S            MOVE DIST COUNTS TO MPCAND
079A 67           1345          LISU   7
079B 5E           1346          LR     D,A
079C 8FFB    0798 1347          BR7    TI11
079E 69           1348          LISL   1
079F 4E           1349          LR     A,D
07A0 2506         1350          CI     6              IF >40 MPH, DISP DASHES FO
07A2 9208    07AB 1351          BNC    TI12
07A4 940E    07B3 1352          BNZ    TI13           EXCEED H'63F'?
07A6 4E           1353          LR     A,D
07A7 253F         1354          CI     H'3F'
07A9 8209    07B3 1355          BC     TI13
07AB 20AA         1356   TI12   LI     H'AA'          SPEED LIMIT EXCEEDED
07AD 63           1357          LISU   3
07AE 6E           1358          LISL   6
07AF 5D           1359          LR     I,A
07B0 5C           1360          LR     S,A
07B1 9021    07D3 1361          BR     TI14
07B3 2A0F33  0F33 1362   TI13   DCI    SPCONV         SPEED OK; CONVERT TO READO
07B6 A5           1363          INS    5
07B7 8103    07BB 1364          BP     TI15           E/M
07B9 72           1365          LIS    2
07BA 8E           1366          ADC
07BB 67           1367   TI15   LISU   7
07BC 6A           1368          LISL   2
07BD 16           1369          LM                    LOAD CONV FACTOR
07BE 5D           1370          LR     I,A
07BF 16           1371          LM
07C0 5C           1372          LR     S,A
07C1 280D01  0D01 1373          PI     MULBIN
```

```
07C4 280BB1 0BB1 1374        PI    MRTST
07C7 280D8F 0D8F 1375        PI    BNTDC    CONVERT TO BCD
07CA 68           1376       LISL  0
07CB 4D           1377       LR    A,I
07CC 52           1378       LR    2,A
07CD 4C           1379       LR    A,S
07CE 63           1380       LISU  3         MOVE TO STORE SPOT
07CF 6F           1381       LISL  7
07D0 5E           1382       LR    D,A
07D1 42           1383       LR    A,2
07D2 5C           1384       LR    S,A
07D3 2A0FCF 0FCF 1385  TI14  DCI   H'FCF'   NO AREA ACC IF DIST
07D6 70           1386       CLR
07D7 88           1387       AM
07D8 57           1388       LR    7,A
07D9 8417   07F1  1389       BZ    TI77
07DB A4           1390       INS   4
07DC 2120         1391       NI    H'20'
07DE 9404   07E3  1392       BNZ   *+5
07E0 290891 0891  1393  T16J JMP   TI16
07E3 A4           1394       INS   4
07E4 2101         1395       NI    1
07E6 84F9   07E0  1396       BZ    T16J
07E8 2A0FF2 0FF2  1397       DCI   H'FF2'
07EB 67           1398       LISU  7
07EC 6A           1399       LISL  2
07ED 16           1400       LM
07EE 5D           1401       LR    I,A
07EF 16           1402       LM
07F0 5C           1403       LR    S,A
07F1 69           1404  TI77 LISL  1
07F2 64           1405  TI17 LISU  4         LOAD CAL DIST COUNTS
07F3 4C           1406       LR    A,S
07F4 67           1407       LISU  7
07F5 5E           1408       LR    D,A
07F6 8FFB   07F2  1409       BR7   TI17
07F8 70           1410       CLR
07F9 C7           1411       AS    7
07FA 9411   080C  1412       BNZ   TI18
07FC 6A           1413       LISL  2
07FD 2A0F46 0F46  1414       DCI   DISFUD
0800 A5           1415       INS   5
0801 8103   0805  1416       BP    *+4
0803 72           1417       LIS   2
0804 8E           1418       ADC
0805 16           1419       LM
0806 5D           1420       LR    I,A
0807 16           1421       LM
0808 5C           1422       LR    S,A
0809 72           1423       LIS   2         EXP ADJUST!!!!!
080A 9002   080D  1424       BR    TI19      EXP ADJ FOR AREA
080C 76           1425  TI18 LIS   6
080D 66           1426  TI19 LISU  6
080E 68           1427       LISL  0
080F 5C           1428       LR    S,A
0810 67           1429       LISU  7
0811 69           1430       LISL  1
0812 280C5A 0C5A 1431        PI    NRMLZ
0815 280CEC 0CEC 1432        PI    SUBEXP
0818 67           1433       LISU  7
0819 6B           1434       LISL  3
081A 280C5A 0C5A 1435        PI    NRMLZ
081D 280CEC 0CEC 1436        PI    SUBEXP
0820 280D01 0D01 1437        PI    MULBIN
0823 280C7F 0C7F 1438        PI    SHRES
0826 70           1439       CLR
0827 C7           1440       AS    7
0828 9430   0859  1441       BNZ   TI20
082A 2A0FDB 0FDB 1442        DCI   H'FDB'
082D 64           1443       LISU  4         LOAD DIST FROM RAM
082E 6E           1444       LISL  6
082F 16           1445       LM
0830 5D           1446       LR    I,A
0831 16           1447       LM
0832 5C           1448       LR    S,A
0833 280BB1 0BB1 1449        PI    MRTST
0836 280D8F 0D8F 1450        PI    BNTDC
0839 69           1451       LISL  1
```

```
083A 4E         1452        LR     A,D
083B 52         1453        LR     2,A
083C 4C         1454        LR     A,S
083D 64         1455        LISU   4
083E 6D         1456        LISL   5
083F 2466       1457        AI     H'66'      ADD XX.XX FT/MTRS TO ACC
0841 DC         1458        ASD    S
0842 5D         1459        LR     I,A
0843 4C         1460        LR     A,S
0844 19         1461        LNK
0845 5C         1462        LR     S,A
0846 42         1463        LR     A,2
0847 2466       1464        AI     H'66'
0849 DC         1465        ASD    S
084A 5D         1466        LR     I,A
084B 2066       1467        LI     H'66'
084D 19         1468        LNK
084E DC         1469        ASD    S
084F 5E         1470        LR     D,A
0850 2A0FDB 0FDB 1471      DCI    H'FDB'
0853 4D         1472        LR     A,I
0854 17         1473        ST
0855 4C         1474        LR     A,S
0856 17         1475        ST
0857 9039 0891  1476        BR     TI16
0859 2A0FD8 0FD8 1477 TI20 DCI    H'FD8'
085C 64         1478        LISU   4
085D 6E         1479        LISL   6
085E 16         1480        LM
085F 5D         1481        LR     I,A
0860 16         1482        LM
0861 5C         1483        LR     S,A
0862 67         1484        LISU   7
0863 6D         1485        LISL   5          HERE'S INC AREA, BINARY
0864 4D         1486        LR     A,I
0865 52         1487        LR     2,A
0866 4C         1488        LR     A,S
0867 53         1489        LR     3,A
0868 64         1490        LISU   4          ADD TO PRESENT AREA FRACTI
0869 6C         1491        LISL   4
086A 4C         1492        LR     A,S
086B C2         1493        AS     2
086C 5D         1494        LR     I,A
086D 4C         1495        LR     A,S
086E 19         1496        LNK
086F C3         1497        AS     3
0870 5C         1498        LR     S,A
0871 24C0       1499 AREA   AI     H'C0'
0873 921D 0891  1500        BNC    TI16
0875 5C         1501        LR     S,A
0876 6E         1502        LISL   6
0877 2067       1503        LI     H'67'      INCREMENT BCD AREA ACC
0879 DC         1504        ASD    S
087A 5D         1505        LR     I,A
087B 2066       1506        LI     H'66'
087D 19         1507        LNK
087E DC         1508        ASD    S
087F 5E         1509        LR     D,A
0880 2A0FD8 0FD8 1510      DCI    H'FD8'
0883 4D         1511        LR     A,I
0884 1A         1512        DI
0885 17         1513        ST
0886 4E         1514        LR     A,D
0887 17         1515        ST
0888 CE         1516        AS     D
0889 18         1517        COM
088A 2456       1518        AI     H'56'
088C 17         1519        ST
088D 1B         1520        EI
088E 4C         1521        LR     A,S
088F 90E1 0871  1522        BR     AREA       NOW REPEAT
0891 280BE1 0BE1 1523 TI16 PI     PRCONV
0894 A4         1524        INS    4
0895 2120       1525        NI     H'20'
0897 8437 08CF  1526        BZ     PROK
0899 2A0FCF 0FCF 1527      DCI    H'FCF'
089C 70         1528        CLR                NO PRESS ERRS IF DIST
089D 88         1529        AM
089E 8430 08CF  1530        BZ     PROK
```

```
08A0 A5              1531           INS    5
08A1 2118            1532           NI     H'18'
08A3 13              1533           SL     1
08A4 14              1534           SR     4
08A5 2A0F37 0F37     1535           DCI    PLTAB
08A8 8E              1536           ADC
08A9 67              1537           LISU   7
08AA 6D              1538           LISL   5
08AB 4D              1539           LR     A,I
08AC 8D              1540           CM                   IS LIMIT > ACC?
08AD 820C    08BA    1541           BC     LPER
08AF 18              1542           COM                  OK SO FAR
08B0 1F              1543           INC
08B1 52              1544           LR     2,A
08B2 66              1545           LISU   6
08B3 CD              1546           AS     I              COMP W HI LIMIT
08B4 9215    08CA    1547           BNC    HPER
08B6 42              1548           LR     A,2
08B7 CC              1549           AS     S              COMP W LO LIMIT
08B8 9216    08CF    1550           BNC    PROK
08BA 2A0F3A 0F3A     1551   LPER    DCI    MSLPP          LO PRESS ERROR
08BD 280DC9 0DC9     1552   BPER    PI     MESDIS
08C0 62              1553           LISU   2
08C1 6D              1554           LISL   5              UPDATE ALARM STATUS
08C2 2083            1555           LI     H'83'
08C4 FC              1556           NS     S
08C5 2208            1557           OI     8
08C7 5C              1558           LR     S,A
08C8 9012    08DB    1559           BR     DWPRCK
08CA 2A0F3E 0F3E     1560   HPER    DCI    MSHPR
08CD 90EF    08BD    1561           BR     BPER
08CF 62              1562   PROK    LISU   2              OK; ERASE PRESS ERROR
08D0 6D              1563           LISL   5
08D1 7C              1564           LIS    H'C'
08D2 FC              1565           NS     S
08D3 2508            1566           CI     8
08D5 9405    08DB    1567           BNZ    DWPRCK
08D7 2083            1568           LI     H'83'
08D9 FC              1569           NS     S
08DA 5C              1570           LR     S,A
08DB A4              1571   DWPRCK  INS    4              CHECK INAC APPL INPUT
08DC 9111    08EE    1572           BM     VALOK
08DE 2A0F42 0F42     1573           DCI    MSINAC
08E1 280DC9 0DC9     1574           PI     MESDIS         SET INAC ALARM AND DISP
08E4 62              1575           LISU   2
08E5 6D              1576           LISL   5
08E6 2083            1577           LI     H'83'
08E8 FC              1578           NS     S
08E9 220C            1579           OI     H'C'
08EB 5C              1580           LR     S,A
08EC 900D    08FA    1581           BR     VALB
08EE 62              1582   VALOK   LISU   2
08EF 6D              1583           LISL   5
08F0 7C              1584           LIS    H'C'           ERASE INAC ERROR
08F1 FC              1585           NS     S
08F2 250C            1586           CI     H'C'
08F4 9405    08FA    1587           BNZ    VALB
08F6 2083            1588           LI     H'83'
08F8 FC              1589           NS     S
08F9 5C              1590           LR     S,A
08FA 67              1591   VALB    LISU   7              SAVE PRESS COUNTS
08FB 6D              1592           LISL   5
08FC 4C              1593           LR     A,S
08FD 66              1594           LISU   6
08FE 69              1595           LISL   1
08FF 5C              1596           LR     S,A
0900 280CF9 0CF9     1597           PI     MRTMCD
0903 69              1598           LISL   1
0904 280C5A 0C5A     1599           PI     NRMLZ
0907 66              1600           LISU   6
0908 68              1601           LISL   0
0909 42              1602           LR     A,2            SAVE EXP
090A 18              1603           COM
090B 1F              1604           INC
090C 5C              1605           LR     S,A
090D 2A0F21 0F21     1606           DCI    PRDIST         PRESS READOUT CONV
0910 A5              1607           INS    5
0911 2118            1608           NI     H'18'          6 BYTES EACH
```

```
0913 12            1609         SR    1
0914 52            1610         LR    2,A
0915 12            1611         SR    1
0916 C2            1612         AS    2
0917 8E            1613         ADC
0918 280BA3 0BA3   1614         PI    LDMPR
091B 280D01 0D01   1615         PI    MULBIN     LOAD FACTOR AND EXP SHIFT
091E 280C7F 0C7F   1616         PI    SHRES
0921 280BB1 0BB1   1617         PI    MRTST
0924 280D8F 0D8F   1618         PI    BNTDC
0927 68            1619         LISL  0
0928 4D            1620         LR    A,I
0929 52            1621         LR    2,A
092A 4C            1622         LR    A,S
092B 6D            1623         LISL  5
092C 63            1624         LISU  3
092D 5E            1625         LR    D,A
092E 42            1626         LR    A,2
092F 5C            1627         LR    S,A
0930 66            1628         LISU  6
0931 69            1629         LISL  1           DO SQR(P)
0932 4C            1630         LR    A,S
0933 67            1631         LISU  7
0934 6D            1632         LISL  5
0935 5C            1633         LR    S,A
0936 280CA9 0CA9   1634         PI    SQRP
0939 64            1635         LISU  4
093A 68            1636         LISL  0
093B 4D            1637         LR    A,I        IF DIST = 0 THEN
093C CE            1638         AS    D          GPA = 0
093D 19            1639         LNK
093E 9408 0947     1640         BNZ   PTC1
0940 63            1641         LISU  3
0941 6A            1642         LISL  2
0942 5D            1643         LR    I,A
0943 5C            1644         LR    S,A
0944 2909F7 09F7   1645         JMP   PTC2
0947 4D            1646  PTC1   LR    A,I
0948 52            1647         LR    2,A
0949 4C            1648         LR    A,S
094A 67            1649         LISU  7
094B 6B            1650         LISL  3
094C 5E            1651         LR    D,A
094D 42            1652         LR    A,2
094E 5D            1653         LR    I,A
094F 280C7A 0C7A   1654         PI    NRM14
0952 66            1655         LISU  6
0953 68            1656         LISL  0
0954 42            1657         LR    A,2
0955 5C            1658         LR    S,A
0956 67            1659         LISU  7
0957 69            1660         LISL  1
0958 280C7A 0C7A   1661         PI    NRM14
095B 280CEC 0CEC   1662         PI    SUBEXP
095E 280D47 0D47   1663         PI    DIVBIN     COMPUTE SQR(P)/SPEED
0961 2A0FF0 0FF0   1664         DCI   H'FF0'
0964 6A            1665         LISL  2
0965 16            1666         LM
0966 5D            1667         LR    I,A
0967 16            1668         LM
0968 5C            1669         LR    S,A
0969 280CF9 0CF9   1670         PI    MRTMCD
096C 69            1671         LISL  1
096D 280C5A 0C5A   1672         PI    NRMLZ
0970 280CEC 0CEC   1673         PI    SUBEXP
0973 280D01 0D01   1674         PI    MULBIN
0976 280C7F 0C7F   1675         PI    SHRES      HERE'S GPA OR LPH
0979 2A0FFE 0FFE   1676         DCI   H'FFE'
097C 16            1677         LM
097D 52            1678         LR    2,A
097E 16            1679         LM
097F 53            1680         LR    3,A        GPA AVG
0980 67            1681         LISU  7
0981 6D            1682         LISL  5
0982 4D            1683         LR    A,I
0983 54            1684         LR    4,A
0984 4E            1685         LR    A,D
0985 55            1686         LR    5,A
```

```
0986 280E57 0E57 1687        PI    COMP
0989 9419    09A3 1688        BNZ   GPA1
098B 42           1689        LR    A,2
098C C2           1690        AS    2
098D 52           1691        LR    2,A       MPY BY 2
098E 43           1692        LR    A,3
098F 19           1693        LNK
0990 53           1694        LR    3,A
0991 280E57 0E57 1695        PI    COMP
0994 941A    09AF 1696        BNZ   GPA2
0996 2A0FFC 0FFC 1697  GPA3  DCI   H'FFC'
0999 4D           1698        LR    A,I
099A 17           1699        ST
099B 4E           1700        LR    A,D
099C 17           1701        ST
099D 4D           1702        LR    A,I
099E 17           1703        ST
099F 4E           1704        LR    A,D
09A0 17           1705        ST
09A1 900D    09AF 1706        BR    GPA2
09A3 44           1707  GPA1  LR    A,4
09A4 C4           1708        AS    4
09A5 54           1709        LR    4,A
09A6 45           1710        LR    A,5
09A7 19           1711        LNK
09A8 C5           1712        AS    5
09A9 55           1713        LR    5,A
09AA 280E57 0E57 1714        PI    COMP
09AD 94E8    0996 1715        BNZ   GPA3
09AF 4C           1716  GPA2  LR    A,S
09B0 CD           1717        AS    I
09B1 54           1718        LR    4,A       NOW AVG
09B2 4C           1719        LR    A,S
09B3 19           1720        LNK
09B4 CC           1721        AS    S
09B5 55           1722        LR    5,A
09B6 2A0FFC 0FFC 1723        DCI   H'FFC'
09B9 16           1724        LM
09BA C4           1725        AS    4
09BB 54           1726        LR    4,A
09BC 16           1727        LM
09BD 19           1728        LNK
09BE C5           1729        AS    5
09BF 55           1730        LR    5,A
09C0 16           1731        LM
09C1 C4           1732        AS    4
09C2 54           1733        LR    4,A
09C3 16           1734        LM
09C4 19           1735        LNK
09C5 C5           1736        AS    5
09C6 55           1737        LR    5,A
09C7 65           1738        LISU  5
09C8 6B           1739        LISL  3
09C9 44           1740        LR    A,4
09CA 12           1741        SR    1
09CB 12           1742        SR    1
09CC 5C           1743        LR    S,A
09CD 45           1744        LR    A,5
09CE 15           1745        SL    4
09CF 13           1746        SL    1
09D0 13           1747        SL    1
09D1 EC           1748        XS    S
09D2 5D           1749        LR    I,A
09D3 45           1750        LR    A,5
09D4 12           1751        SR    1
09D5 12           1752        SR    1
09D6 5C           1753        LR    S,A
09D7 280D8F 0D8F 1754        PI    BNTDC     CONV TO BCD
09DA 68           1755        LISL  0
09DB 4D           1756        LR    A,I       STORE
09DC 52           1757        LR    2,A
09DD 4D           1758        LR    A,I
09DE 63           1759        LISU  3
09DF 6B           1760        LISL  3
09E0 5E           1761        LR    D,A
09E1 42           1762        LR    A,2
09E2 5C           1763        LR    S,A
09E3 2A0FFC 0FFC 1764        DCI   H'FFC'
```

```
09E6 16              1765           LM                  UPDATE GPA AVG LOCS
09E7 52              1766           LR    2,A
09E8 16              1767           LM
09E9 53              1768           LR    3,A
09EA 42              1769           LR    A,2
09EB 17              1770           ST
09EC 43              1771           LR    A,3
09ED 17              1772           ST
09EE 2A0FFC 0FFC     1773           DCI   H'FFC'
09F1 67              1774           LISU  7
09F2 6D              1775           LISL  5
09F3 4D              1776           LR    A,I
09F4 17              1777           ST
09F5 4C              1778           LR    A,S
09F6 17              1779           ST
09F7 62              1780  PTC2     LISU  2             CHECK FOR CLEAR AREA OPERA
09F8 6D              1781           LISL  5
09F9 7C              1782           LIS   H'C'
09FA FC              1783           NS    S
09FB 2504            1784           CI    4
09FD 9421   0A1F     1785           BNZ   T1END
09FF 20F0            1786           LI    H'F0'
0A01 CC              1787           AS    S              DECREMENT 5 SEC COUNTER
0A02 5C              1788           LR    S,A
0A03 2170            1789           NI    H'70'
0A05 2510            1790           CI    H'10'
0A07 9417   0A1F     1791           BNZ   T1END
0A09 2083            1792           LI    H'83'          HERE IT IS
0A0B FC              1793           NS    S
0A0C 5C              1794           LR    S,A            RESET AREA OR DIST
0A0D 64              1795           LISU  4
0A0E 6C              1796           LISL  4
0A0F 70              1797           CLR
0A10 5D              1798           LR    I,A
0A11 5D              1799           LR    I,A
0A12 5D              1800           LR    I,A
0A13 5C              1801           LR    S,A
0A14 2A0FD8 0FD8     1802           DCI   H'FD8'
0A17 70              1803           CLR                  ZERO STORED AREA
0A18 1A              1804           DI
0A19 17              1805           ST
0A1A 17              1806           ST
0A1B 2055            1807           LI    H'55'
0A1D 17              1808           ST
0A1E 1B              1809           EI
0A1F 2906DE 06DE     1810  T1END    JMP   T49
                     1811  *
0A22 08              1812  STSLCK   LR    K,P            CHECK SET/SELECT
0A23 00              1813           LR    A,KU
0A24 06              1814           LR    QU,A
0A25 01              1815           LR    A,KL
0A26 07              1816           LR    QL,A
0A27 A4              1817           INS   4
0A28 12              1818           SR    1
0A29 15              1819           SL    4
0A2A 810C   0A37     1820           BP    STS1
0A2C 76              1821           LIS   6              SET SWITCH ON
0A2D F8              1822           NS    8
0A2E 944A   0A79     1823           BNZ   STSR
0A30 48              1824           LR    A,8            NOT HELD OR IGNORED
0A31 2204            1825           OI    4              SET IGNORE BIT
0A33 58              1826           LR    8,A
0A34 290A7F 0A7F     1827           JMP   INCD1          INCREMENT THE DIGIT
0A37 48              1828  STS1     LR    A,8
0A38 21F9            1829           NI    H'F9'
0A3A 58              1830           LR    8,A
0A3B 62              1831           LISU  2
0A3C 6D              1832           LISL  5
0A3D 2070            1833           LI    H'70'
0A3F FC              1834           NS    S
0A40 8405   0A46     1835           BZ    DCARR
0A42 2083            1836           LI    H'83'
0A44 FC              1837           NS    S
0A45 5C              1838           LR    S,A
0A46 A4              1839  DCARR    INS   4
0A47 15              1840           SL    4              SET NOT ON
0A48 812C   0A75     1841           BP    STS2
0A4A 62              1842           LISU  2              SELECT SW ON
```

```
0A4B 68              1843           LISL   0
0A4C 4C              1844           LR     A,S
0A4D 15              1845           SL     4
0A4E 25C0            1846           CI     H'C0'        IGNORE IF TRIM
0A50 8428   0A79     1847           BZ     STSR           OR AREA
0A52 25E0            1848           CI     H'E0'
0A54 8424   0A79     1849           BZ     STSR
0A56 48              1850   STS3    LR     A,8
0A57 13              1851           SL     1
0A58 9120   0A79     1852           BM     STSR         IGNORE?
0A5A 65              1853           LISU   5              NO
0A5B 6A              1854           LISL   2
0A5C 2030            1855           LI     H'30'        UPDATE DIG SELECT
0A5E FC              1856           NS     S
0A5F 14              1857           SR     4            DON'T MOVE PAST LAST DIGIT
0A60 18              1858           COM
0A61 2404            1859           AI     4
0A63 EC              1860           XS     S
0A64 2103            1861           NI     3
0A66 9406   0A6D     1862           BNZ    STS5
0A68 4C              1863           LR     A,S
0A69 21FC            1864           NI     H'FC'
0A6B 9003   0A6F     1865           BR     STS4
0A6D 4C              1866   STS5    LR     A,S          NOT THERE YET
0A6E 1F              1867           INC
0A6F 5C              1868   STS4    LR     S,A
0A70 48              1869           LR     A,8
0A71 2240            1870           OI     H'40'        SET IGNORE BIT
0A73 58              1871           LR     8,A          DONE...
0A74 0D              1872           LR     P0,Q
0A75 48              1873   STS2    LR     A,8
0A76 21BF            1874           NI     H'BF'
0A78 58              1875           LR     8,A
0A79 0D              1876   STSR    LR     P0,Q
                     1877   *
                     1878   *
0A7A 08              1879   INCDIG  LR     K,P
0A7B 00              1880           LR     A,KU
0A7C 06              1881           LR     QU,A
0A7D 01              1882           LR     A,KL
0A7E 07              1883           LR     QL,A
0A7F 62              1884   INCD1   LISU   2
0A80 68              1885           LISL   0
0A81 4C              1886           LR     A,S
0A82 15              1887           SL     4
0A83 25F0            1888           CI     H'F0'
0A85 8440   0AC6     1889           BZ     INC9
0A87 25C0            1890           CI     H'C0'        TRIM?
0A89 8422   0AAC     1891           BZ     INC2
0A8B 25E0            1892           CI     H'E0'        AREA
0A8D 9446   0AD4     1893           BNZ    INC1
0A8F 64              1894           LISU   4
0A90 6D              1895           LISL   5
0A91 70              1896           CLR
0A92 CD              1897           AS     I            IN AREA MODE
0A93 CD              1898           AS     I             IS AREA ALREADY ZERO?
0A94 19              1899           LNK
0A95 CC              1900           AS     S
0A96 19              1901           LNK
0A97 8413   0AAB     1902           BZ     INCR
0A99 62              1903           LISU   2
0A9A 6D              1904           LISL   5
0A9B 7C              1905           LIS    H'C'         ALARMS ALL OFF?
0A9C FC              1906           NS     S
0A9D 940D   0AAB     1907           BNZ    INCR
0A9F 2A0FCF 0FCF     1908           DCI    H'FCF'
0AA2 88              1909           AM
0AA3 8407   0AAB     1910           BZ     INCR         NO AREA CLR IF DIST MODE
0AA5 2083            1911           LI     H'83'
0AA7 FC              1912           NS     S
0AA8 2264            1913           OI     H'64'        START COUNTER
0AAA 5C              1914           LR     S,A
0AAB 0D              1915   INCR    LR     P0,Q
0AAC 2A0FDD 0FDD     1916   INC2    DCI    H'FDD'       TRIM MODE
0AAF 280C4B 0C4B     1917           PI     INDATA       LOAD IT
0AB2 6B              1918           LISL   3
0AB3 4C              1919           LR     A,S
0AB4 256A            1920           CI     106
```

```
0AB6 9403      0ABA 1921           BNZ    INC3
0AB8 205D           1922           LI     93             6 ROLLS OVER TO -6
0ABA 1F             1923  INC3     INC
0ABB 5C             1924           LR     S,A
0ABC 2A0FDD    0FDD 1925           DCI    H'FDD'
0ABF 280B7F    0B7F 1926           PI     CKAST
0AC2 280BBD    0BBD 1927           PI     TRIMD          DECODE TO BCD
0AC5 0D             1928           LR     P0,Q
0AC6 2A0FF4    0FF4 1929  INC9     DCI    H'FF4'
0AC9 280C4B    0C4B 1930           PI     INDATA
0ACC 6C             1931           LISL   4
0ACD 4C             1932           LR     A,S
0ACE 213F           1933           NI     H'3F'
0AD0 5C             1934           LR     S,A
0AD1 260D8F    0D8F 1935           PI     BNTDC
0AD4 65             1936  INC1     LISU   5              NOT AN ODDBALL
0AD5 6A             1937           LISL   2
0AD6 73             1938           LIS    3
0AD7 FE             1939           NS     D
0AD8 52             1940           LR     2,A            GET SELECTED DIGIT
0AD9 2501           1941           CI     1
0ADB 9102      0ADE 1942           BM     SET1
0ADD 4E             1943           LR     A,D
0ADE 71             1944  SET1     LIS    1
0ADF F2             1945           NS     2
0AE0 9410      0AF1 1946           BNZ    SET2
0AE2 7F             1947           LIS    H'F'
0AE3 FC             1948           NS     S              INC LO DIGIT OF BYTE
0AE4 1F             1949           INC
0AE5 250A           1950           CI     H'A'
0AE7 9402      0AEA 1951           BNZ    SET3
0AE9 70             1952           CLR
0AEA 52             1953  SET3     LR     2,A
0AEB 20F0           1954           LI     H'F0'
0AED FC             1955           NS     S
0AEE E2             1956           XS     2
0AEF 900A      0AFA 1957           BR     SET4
0AF1 4C             1958  SET2     LR     A,S            HI DIGIT OF BYTE
0AF2 2410           1959           AI     H'10'
0AF4 2599           1960           CI     H'99'
0AF6 8203      0AFA 1961           BC     SET4
0AF8 210F           1962           NI     H'F'
0AFA 5C             1963  SET4     LR     S,A
0AFB 62             1964           LISU   2
0AFC 68             1965           LISL   0
0AFD 4C             1966           LR     A,S
0AFE 15             1967           SL     4              IN Q SET MODE?
0AFF 2530           1968           CI     H'30'
0B01 943A      0B3C 1969           BNZ    INCF
0B03 A5             1970           INS    5
0B04 65             1971           LISU   5
0B05 6A             1972           LISL   2
0B06 7C             1973           LIS    H'C'
0B07 8113      0B1B 1974           BP     SET5
0B09 FC             1975           NS     S              METRIC
0B0A 2504           1976           CI     4
0B0C 68             1977  SET7     LISL   0              SHIFT RIGHT IF .9 -> .0
0B0D 9407      0B15 1978           BNZ    SET6
0B0F 7F             1979           LIS    H'F'           SHIFT LEFT IF  .0 -> .1
0B10 FD             1980           NS     I
0B11 941C      0B2E 1981           BNZ    SHLF
0B13 9028      0B3C 1982           BR     INCF
0B15 4C             1983  SET6     LR     A,S
0B16 14             1984           SR     4
0B17 8408      0B20 1985           BZ     SHRT
0B19 9022      0B3C 1986           BR     INCF
0B1B FC             1987  SET5     NS     S              ENGLISH
0B1C 2508           1988           CI     8
0B1E 90ED      0B0C 1989           BR     SET7
0B20 5D             1990  SHRT     LR     I,A
0B21 4E             1991           LR     A,D
0B22 15             1992           SL     4
0B23 EC             1993           XS     S
0B24 5D             1994           LR     I,A
0B25 4C             1995           LR     A,S
0B26 14             1996           SR     4
0B27 5D             1997           LR     I,A
0B28 4C             1998           LR     A,S
```

```
0B29 24FB        1999              AI    H'FB'
0B2B 5C          2000              LR    S,A
0B2C 900F   0B3C 2001              BR    INCF
0B2E 4C          2002    SHLF      LR    A,S
0B2F 15          2003              SL    4
0B30 5E          2004              LR    D,A
0B31 4D          2005              LR    A,I
0B32 14          2006              SR    4
0B33 EC          2007              XS    S
0B34 5E          2008              LR    D,A
0B35 4C          2009              LR    A,S
0B36 15          2010              SL    4
0B37 5C          2011              LR    S,A
0B38 6A          2012              LISL  2          INC DP AND SEL DIGIT
0B39 75          2013              LIS   5
0B3A CC          2014              AS    S
0B3B 5C          2015              LR    S,A
0B3C 62          2016    INCF      LISU  2
0B3D 68          2017              LISL  0          NO COLON RESET IF
0B3E 7F          2018              LIS   H'F'      LO PRESS AND
0B3F FC          2019              NS    S          OFFSET NOT OK
0B40 2502        2020              CI    2
0B42 940B   0B4E 2021              BNZ   INCFF
0B44 2A0FF7 0FF7 2022              DCI   H'FF7'
0B47 16          2023              LM
0B48 88          2024              AM
0B49 88          2025              AM
0B4A 2555        2026              CI    H'55'
0B4C 9407   0B54 2027              BNZ   INCFG
0B4E 65          2028    INCFF     LISU  5
0B4F 6A          2029              LISL  2
0B50 4C          2030              LR    A,S        RESET COLON
0B51 13          2031              SL    1
0B52 12          2032              SR    1
0B53 5C          2033              LR    S,A
0B54 280BF3 0BF3 2034    INCFG     PI    DCTOHX
0B57 62          2035              LISU  2
0B58 68          2036              LISL  0
0B59 4C          2037              LR    A,S
0B5A 15          2038              SL    4
0B5B 9114   0B70 2039              BM    INCA
0B5D 14          2040              SR    4          ADDR FROM S4 IF SETUP
0B5E 52          2041              LR    2,A
0B5F 13          2042              SL    1
0B60 C2          2043              AS    2
0B61 2A0FC0 0FC0 2044              DCI   H'FC0'
0B64 8E          2045              ADC
0B65 65          2046    INCB      LISU  5
0B66 6B          2047              LISL  3
0B67 4D          2048              LR    A,I
0B68 1A          2049              DI
0B69 17          2050              ST
0B6A 4D          2051              LR    A,I
0B6B 17          2052              ST
0B6C 4D          2053              LR    A,I
0B6D 17          2054              ST
0B6E 1B          2055              EI
0B6F 0D          2056              LR    P0,Q
0B70 2A0FF4 0FF4 2057    INCA      DCI   H'FF4'    MUST BE TEST SPEED
0B73 90F1   0B65 2058              BR    INCB
                 2059    *
                 2060    *
0B75 08          2061    MOVTIO    LR    K,P        MOVE @ IS, IS-1 TO R 53,54
0B76 4E          2062              LR    A,D
0B77 52          2063              LR    2,A
0B78 4C          2064              LR    A,S
0B79 65          2065              LISU  5
0B7A 6B          2066              LISL  3
0B7B 5D          2067              LR    I,A
0B7C 42          2068              LR    A,2
0B7D 5C          2069              LR    S,A
0B7E 0C          2070              PK
                 2071    *
                 2072    *
0B7F 08          2073    CKAST     LR    K,P        ADD CHECKSUM TO R 53,54
0B80 65          2074              LISU  5
0B81 6B          2075              LISL  3
0B82 4D          2076              LR    A,I
```

```
0B83 CD        2077          AS    I
0B84 18        2078          COM
0B85 2456      2079          AI    H'56'
0B87 5C        2080          LR    S,A           AND STORE VALUE
0B88 6B        2081          LISL  3
0B89 4D        2082          LR    A,I
0B8A 1A        2083          DI
0B8B 17        2084          ST
0B8C 4D        2085          LR    A,I
0B8D 17        2086          ST
0B8E 4C        2087          LR    A,S
0B8F 17        2088          ST
0B90 1B        2089          EI
0B91 0C        2090          PK
               2091    *
               2092    *
0B92 08        2093   LDMPCD LR    K,P
0B93 A5        2094          INS   5
0B94 8103 0B98 2095          BP    LDC1
0B96 73        2096          LIS   3
0B97 8E        2097          ADC
0B98 16        2098   LDC1   LM
0B99 66        2099          LISU  6
0B9A 68        2100          LISL  0
0B9B CC        2101          AS    S
0B9C 5C        2102          LR    S,A
0B9D 67        2103   LDCB   LISU  7
0B9E 16        2104          LM
0B9F 5D        2105          LR    I,A
0BA0 16        2106          LM
0BA1 5C        2107          LR    S,A
0BA2 0C        2108          PK
               2109    *
0BA3 08        2110   LDMPR  LR    K,P           LIKE ABOVE, TO MPIER REG
0BA4 A5        2111          INS   5
0BA5 8103 0BA9 2112          BP    LDP1
0BA7 73        2113          LIS   3
0BA8 8E        2114          ADC
0BA9 16        2115   LDP1   LM
0BAA 66        2116          LISU  6
0BAB 68        2117          LISL  0
0BAC CC        2118          AS    S
0BAD 5C        2119          LR    S,A
0BAE 6A        2120          LISL  2
0BAF 90ED 0B9D 2121          BR    LDCB
               2122    *
               2123    *
0BB1 08        2124   MRTST  LR    K,P           MOVE RESULT TO R 53,54
0BB2 67        2125          LISU  7
0BB3 6D        2126          LISL  5
0BB4 4D        2127          LR    A,I
0BB5 52        2128          LR    2,A
0BB6 4C        2129          LR    A,S
0BB7 65        2130          LISU  5
0BB8 6C        2131          LISL  4
0BB9 5E        2132          LR    D,A
0BBA 42        2133          LR    A,2
0BBB 5C        2134          LR    S,A
0BBC 0C        2135          PK
               2136    *
               2137    *
0BBD 08        2138   TRIMD  LR    K,P           DISPLAY TRIM FACTOR
0BBE 2A0FDD 0FDD 2139        DCI   H'FDD'
0BC1 16        2140          LM
0BC2 2563      2141          CI    99
0BC4 920D 0BD2 2142          BNC   TRI1
0BC6 18        2143          COM                 NEGATIVE #
0BC7 2405      2144          AI    5             ADD MINUS SIGN
0BC9 68        2145   TRI2   LISL  0
0BCA 65        2146          LISU  5
0BCB 5D        2147          LR    I,A
0BCC 70        2148          CLR
0BCD 5D        2149          LR    I,A
0BCE 2030      2150          LI    H'30'
0BD0 5C        2151          LR    S,A           DISP STATUS
0BD1 0C        2152          PK
               2153    *
0BD2 249C      2154   TRI1   AI    -100          POSITIVE
```

```
0BD4 90F4  0BC9 2155              BR     TRI2
                2156       *
0BD6 08         2157       MRTMPR  LR     K,P          MOVE 75,76 TO 72,73
0BD7 67         2158               LISU   7
0BD8 6D         2159               LISL   5
0BD9 4D         2160               LR     A,I
0BDA 52         2161               LR     2,A
0BDB 4C         2162               LR     A,S
0BDC 6B         2163               LISL   3
0BDD 5E         2164               LR     D,A
0BDE 42         2165               LR     A,2
0BDF 5C         2166               LR     S,A
0BE0 0C         2167               PK
                2168       *
                2169       *
0BE1 08         2170       PRCONV  LR     K,P          CONV 20*PRESS TO PRESSURE
0BE2 2A0FFA 0FFA 2171              DCI    H'FFA'
0BE5 67         2172               LISU   7
0BE6 68         2173               LISL   0
0BE7 16         2174               LM
0BE8 5D         2175               LR     I,A
0BE9 16         2176               LM
0BEA 5D         2177               LR     I,A
0BEB 20CD       2178               LI     H'CD'
0BED 5D         2179               LR     I,A
0BEE 7C         2180               LIS    H'C'
0BEF 5C         2181               LR     S,A
0BF0 290D02 0D02 2182              JMP    MULBK
                2183       *
                2184       *
                2185       *
                2186       *
0BF3 08         2187       DCTOHX  LR     K,P
0BF4 65         2188               LISU   5
0BF5 6A         2189               LISL   2
0BF6 2030       2190               LI     H'30'        ZERO DIGITS NOT SHOWN
0BF8 FE         2191               NS     D
0BF9 840B  0C05 2192               BZ     DCT6
0BFB 2510       2193               CI     H'10'
0BFD 8404  0C02 2194               BZ     DCT7
0BFF 70         2195               CLR                 ZERO 2 DIGITS
0C00 9003  0C04 2196               BR     DCT8
0C02 7F         2197       DCT7    LIS    H'F'
0C03 FC         2198               NS     S
0C04 5C         2199       DCT8    LR     S,A          CONVERT DEC NUMBER IN
0C05 73         2200       DCT6    LIS    3            50,51 TO BIN 53,54
0C06 52         2201               LR     2,A          INCLUDE DP AND CHECKSUM
0C07 2A0EAF 0EAF 2202              DCI    HXCNV
0C0A 70         2203               CLR
0C0B 53         2204               LR     3,A
0C0C 54         2205               LR     4,A
0C0D 16         2206       DCT1    LM                  DIG CNTR       2
0C0E 55         2207               LR     5,A          BIN RESULT LO  3
0C0F 16         2208               LM                  BIN RESULT HI  4
0C10 56         2209               LR     6,A          DIG VALUE  LO  5
0C11 71         2210               LIS    1            DIG VALUE  HI  6
0C12 F2         2211               NS     2            DIGIT          7
0C13 8405  0C19 2212               BZ     DCT2
0C15 4C         2213               LR     A,S
0C16 14         2214               SR     4
0C17 9003  0C1B 2215               BR     DCT3
0C19 7F         2216       DCT2    LIS    H'F'
0C1A FE         2217               NS     D
0C1B 57         2218       DCT3    LR     7,A
0C1C 840B  0C28 2219               BZ     DCT4
0C1E 45         2220       DCT5    LR     A,5
0C1F C3         2221               AS     3
0C20 53         2222               LR     3,A          BINARY ADD
0C21 46         2223               LR     A,6
0C22 19         2224               LNK
0C23 C4         2225               AS     4
0C24 54         2226               LR     4,A
0C25 37         2227               DS     7
0C26 94F7  0C1E 2228               BNZ    DCT5
0C28 32         2229       DCT4    DS     2
0C29 94E3  0C0D 2230               BNZ    DCT1
0C2B 7F         2231               LIS    H'F'
```

```
0C2C FC              2232            NS      S           LAST DIGIT
0C2D C3              2233            AS      3
0C2E 53              2234            LR      3,A
0C2F 44              2235            LR      A,4
0C30 19              2236            LNK
0C31 54              2237            LR      4,A
0C32 6A              2238            LISL    2           NOW ADD DP
0C33 7C              2239            LIS     H'C'
0C34 FC              2240            NS      S
0C35 15              2241            SL      4
0C36 E4              2242            XS      4
0C37 54              2243            LR      4,A
0C38 C3              2244            AS      3
0C39 18              2245            COM
0C3A 2456            2246            AI      H'56'
0C3C 6D              2247            LISL    5
0C3D 5E              2248            LR      D,A
0C3E 44              2249            LR      A,4
0C3F 5E              2250            LR      D,A
0C40 43              2251            LR      A,3
0C41 5C              2252            LR      S,A
0C42 0C              2253            PK
                     2254    *
0C43 1A              2255    RAMIN   DI
0C44 42              2256            LR      A,2
0C45 13              2257            SL      1           LOAD DATA ELEMENT (R2)
0C46 C2              2258            AS      2
0C47 2A0FC0 0FC0     2259            DCI     H'FC0'
0C4A 8E              2260            ADC
0C4B 1A              2261    INDATA  DI
0C4C 65              2262            LISU    5
0C4D 6B              2263            LISL    3
0C4E 16              2264            LM
0C4F 5D              2265            LR      I,A
0C50 16              2266            LM
0C51 5D              2267            LR      I,A
0C52 16              2268            LM
0C53 5E              2269            LR      D,A
0C54 CE              2270            AS      D
0C55 CC              2271            AS      S
0C56 2555            2272            CI      H'55'
0C58 1B              2273            EI
0C59 1C              2274            POP
                     2275    *
                     2276    *
0C5A 08              2277    NRMLZ   LR      K,P         NORMALIZE OP AT IS, IS-1
0C5B 2080            2278            LI      H'80'
0C5D 53              2279    NRM3    LR      3,A
0C5E 70              2280            CLR
0C5F 52              2281            LR      2,A
0C60 CE              2282            AS      D
0C61 CD              2283            AS      I
0C62 19              2284            LNK
0C63 9402 0C66       2285            BNZ     NRM1        CHECK FOR ZERO
0C65 0C              2286    NRM2    PK
0C66 43              2287    NRM1    LR      A,3
0C67 FE              2288            NS      D
0C68 94FC 0C65       2289            BNZ     NRM2
0C6A 4C              2290            LR      A,S         SHIFT IT
0C6B CC              2291            AS      S
0C6C 5D              2292            LR      I,A
0C6D 4C              2293            LR      A,S
0C6E 19              2294            LNK
0C6F CC              2295            AS      S
0C70 5C              2296            LR      S,A
0C71 42              2297            LR      A,2
0C72 1F              2298            INC
0C73 52              2299            LR      2,A         KEEP NUMBER OF SHIFTS
0C74 90F1 0C66       2300            BR      NRM1
0C76 08              2301    NRM12   LR      K,P         NORMALIZE TO 12 BITS
0C77 78              2302            LIS     8
0C78 90E4 0C5D       2303            BR      NRM3
0C7A 08              2304    NRM14   LR      K,P         NORMALIZE TO 14 BITS
0C7B 20E0            2305            LI      H'E0'
0C7D 90DF 0C5D       2306            BR      NRM3
                     2307    *
                     2308    *
0C7F 08              2309    SHRES   LR      K,P         SHIFT RESULT TILL REG IS ZE
```

```
0C80 66           2310         LISU  6
0C81 68           2311         LISL  0
0C82 70           2312         CLR
0C83 CC           2313         AS    S
0C84 9402 0C87    2314         BNZ   SHR1
0C86 0C           2315  SHR4   PK                        ZERO: RETURN
0C87 67           2316  SHR1   LISU  7
0C88 6D           2317         LISL  5
0C89 52           2318  SHR3   LR    2,A
0C8A 8113 0C9E    2319         BP    SHR2               LESS THAN ZERO: SHIFT RIGHT
0C8C 4C           2320         LR    A,S
0C8D 12           2321         SR    1
0C8E 5D           2322         LR    I,A
0C8F 4E           2323         LR    A,D
0C90 15           2324         SL    4
0C91 12           2325         SR    1
0C92 15           2326         SL    4
0C93 EC           2327         XS    S
0C94 5D           2328         LR    I,A
0C95 4C           2329         LR    A,S
0C96 12           2330         SR    1
0C97 5E           2331         LR    D,A
0C98 42           2332         LR    A,2
0C99 1F           2333         INC
0C9A 84EB 0C86    2334         BZ    SHR4
0C9C 90EC 0C89    2335         BR    SHR3
                  2336   *
0C9E 4C           2337  SHR2   LR    A,S                >0: SHIFT LEFT
0C9F CC           2338         AS    S
0CA0 5D           2339         LR    I,A
0CA1 4C           2340         LR    A,S
0CA2 19           2341         LNK
0CA3 CC           2342         AS    S
0CA4 5E           2343         LR    D,A
0CA5 32           2344         DS    2
0CA6 94F7 0C9E    2345         BNZ   SHR2
0CA8 0C           2346         PK
                  2347   *
                  2348   *
0CA9 08           2349  SQRP   LR    K,P
0CAA 00           2350         LR    A,KU
0CAB 06           2351         LR    QU,A
0CAC 01           2352         LR    A,KL
0CAD 07           2353         LR    QL,A
0CAE 67           2354         LISU  7                  COMPUTE SQUARE ROOT OF P
0CAF 6D           2355         LISL  5                  ASSUME P IN R75
0CB0 4C           2356         LR    A,S
0CB1 14           2357         SR    4                  HI 4 BITS FOR LOOKUP ADDRES
0CB2 54           2358         LR    4,A
0CB3 4C           2359         LR    A,S
0CB4 15           2360         SL    4
0CB5 69           2361         LISL  1
0CB6 5E           2362         LR    D,A                LO 4 BITS AS MPCAND
0CB7 70           2363         CLR
0CB8 5C           2364         LR    S,A
0CB9 2A0E86 0E86  2365         DCI   SQTAB
0CBC 44           2366         LR    A,4
0CBD 13           2367         SL    1
0CBE 8E           2368         ADC
0CBF 6B           2369         LISL  3
0CC0 70           2370         CLR
0CC1 5E           2371         LR    D,A
0CC2 16           2372         LM
0CC3 5C           2373         LR    S,A                LOAD SLOPE
0CC4 16           2374         LM
0CC5 54           2375         LR    4,A
0CC6 280D01 0D01  2376         PI    MULBIN
0CC9 6D           2377         LISL  5
0CCA 4C           2378         LR    A,S
0CCB C4           2379         AS    4                  HERE'S THE SQUARE ROOT
0CCC 69           2380         LISL  1
0CCD 54           2381         LR    4,A
0CCE 14           2382         SR    4
0CCF 5E           2383         LR    D,A
0CD0 44           2384         LR    A,4
0CD1 15           2385         SL    4                  PUT IN MSBITS OF 12-BIT NUM
0CD2 5C           2386         LR    S,A
0CD3 0D           2387         LR    P0,Q
```

```
                    2388  *
                    2389  *
0CD4 08             2390  MTMCD   LR      K,P         MOVE BIN IN TO MPCAND REGIS
0CD5 65             2391          LISU    5
0CD6 6B             2392          LISL    3
0CD7 4D             2393          LR      A,I
0CD8 52             2394          LR      2,A
0CD9 203F           2395          LI      H'3F'
0CDB FC             2396          NS      S
0CDC 69             2397  MTM2    LISL    1
0CDD 67             2398  MTM1    LISU    7
0CDE 5E             2399          LR      D,A
0CDF 42             2400          LR      A,2
0CE0 5C             2401          LR      S,A
0CE1 0C             2402          PK
                    2403  *
0CE2 08             2404  MTMPR   LR      K,P         MOVE BIN IN TO MPIER REG
0CE3 65             2405          LISU    5
0CE4 6B             2406          LISL    3
0CE5 4D             2407          LR      A,I
0CE6 52             2408          LR      2,A
0CE7 203F           2409          LI      H'3F'
0CE9 FE             2410          NS      D
0CEA 90F2   0CDD    2411          BR      MTM1
                    2412  *
0CEC 08             2413  SUBEXP  LR      K,P         SUBTRACT R2 FROM 60
0CED 42             2414          LR      A,2
0CEE 18             2415          COM
0CEF 1F             2416          INC
0CF0 66             2417  SBX1    LISU    6
0CF1 68             2418          LISL    0
0CF2 CC             2419          AS      S
0CF3 5C             2420          LR      S,A
0CF4 0C             2421          PK
                    2422  *
0CF5 08             2423  ADDEXP  LR      K,P         ADD R2 TO 60
0CF6 42             2424          LR      A,2
0CF7 90F8   0CF0    2425          BR      SBX1
                    2426  *
0CF9 08             2427  MRTMCD  LR      K,P         MOVE RESULT TO MPCAND
0CFA 67             2428          LISU    7
0CFB 6D             2429          LISL    5
0CFC 4D             2430          LR      A,I
0CFD 52             2431          LR      2,A
0CFE 4C             2432          LR      A,S
0CFF 90DC   0CDC    2433          BR      MTM2
                    2434  *
                    2435  *
0D01 08             2436  MULBIN  LR      K,P         16 X 16 BINARY MULTIPLY
0D02 67             2437  MULBK   LISU    7            16 RESULT
0D03 6C             2438          LISL    4           70,71 X 72,73 -> 75,76
0D04 2080           2439          LI      H'80'
0D06 5D             2440          LR      I,A         ROUND RESULT TO 16 BITS
0D07 70             2441          CLR
0D08 5D             2442          LR      I,A
0D09 5D             2443          LR      I,A
0D0A 5C             2444          LR      S,A         CLEAR BOTTOM OF MPCAND
0D0B 70             2445  MUL2    CLR
0D0C 6A             2446          LISL    2
0D0D CD             2447          AS      I
0D0E CC             2448          AS      S           IS MPIER ZERO YET?
0D0F 19             2449          LNK
0D10 8435   0D46    2450          BZ      MUL3
0D12 72             2451          LIS     2
0D13 52             2452          LR      2,A         NO...
0D14 6F             2453          LISL    7
0D15 4C             2454  MUL1    LR      A,S         SHIFT MPCAND RIGHT
0D16 12             2455          SR      1
0D17 5D             2456          LR      I,A
0D18 4E             2457          LR      A,D
0D19 15             2458          SL      4
0D1A 12             2459          SR      1
0D1B 15             2460          SL      4
0D1C EC             2461          XS      S
0D1D 5D             2462          LR      I,A
0D1E 32             2463          DS      2
0D1F 94F5   0D15    2464          BNZ     MUL1
0D21 4C             2465          LR      A,S
0D22 12             2466          SR      1
```

```
0D23 5C            2467          LR     S,A
0D24 6B            2468          LISL   3           LOOK AT MSBIT OF MPIER
0D25 70            2469          CLR
0D26 CC            2470          AS     S
0D27 8114   0D3C   2471          BP     MUL4
0D29 6F            2472          LISL   7           WAS 1; ADD MPCAND TO RESULT
0D2A 4C            2473          LR     A,S
0D2B 6C            2474          LISL   4
0D2C CC            2475          AS     S
0D2D 5C            2476          LR     S,A
0D2E 68            2477          LISL   0
0D2F 4C            2478          LR     A,S
0D30 19            2479          LNK
0D31 8204   0D36   2480          BC     MUL5        IF CARRY HERE, DON'T CHG
0D33 6D            2481          LISL   5             RESULT BYTE
0D34 CC            2482          AS     S
0D35 5C            2483          LR     S,A
0D36 69            2484  MUL5    LISL   1
0D37 4C            2485          LR     A,S
0D38 19            2486          LNK
0D39 6E            2487          LISL   6
0D3A CC            2488          AS     S
0D3B 5C            2489          LR     S,A         HI BYTE OF RESULT
0D3C 6A            2490  MUL4    LISL   2           SHIFT MPIER LEFT
0D3D 4C            2491          LR     A,S
0D3E CC            2492          AS     S
0D3F 5D            2493          LR     I,A
0D40 4C            2494          LR     A,S
0D41 19            2495          LNK
0D42 CC            2496          AS     S
0D43 5C            2497          LR     S,A
0D44 90C6   0D0B   2498          BR     MUL2        NEXT. . .
0D46 0C            2499  MUL3    PK
                   2500  *
                   2501  *
0D47 08            2502  DIVBIN  LR     K,P         14 / 14 -> 12 BIT RESULT
0D48 67            2503          LISU   7
0D49 6D            2504          LISL   5
0D4A 70            2505          CLR                CLEAR RESULT
0D4B 5D            2506          LR     I,A
0D4C 5D            2507          LR     I,A
0D4D 6A            2508          LISL   2
0D4E 4D            2509          LR     A,I
0D4F CC            2510          AS     S
0D50 19            2511          LNK
0D51 843C   0D8E   2512          BZ     DIV9        RET ZERO IF DIV ZERO
0D53 7C            2513          LIS    12
0D54 52            2514          LR     2,A         R2 IS BIT COUNTER
0D55 9011   0D67   2515          BR     DIV2        SKIP SHIFT FIRST TIME
0D57 68            2516  DIV1    LISL   0
0D58 4C            2517          LR     A,S
0D59 CC            2518          AS     S           SHIFT NUMERATOR LEFT
0D5A 5D            2519          LR     I,A
0D5B 4C            2520          LR     A,S
0D5C 19            2521          LNK
0D5D CC            2522          AS     S
0D5E 5C            2523          LR     S,A
0D5F 6D            2524          LISL   5           SHIFT QUOTIENT LEFT
0D60 4C            2525          LR     A,S
0D61 CC            2526          AS     S
0D62 5D            2527          LR     I,A
0D63 4C            2528          LR     A,S
0D64 19            2529          LNK
0D65 CC            2530          AS     S
0D66 5C            2531          LR     S,A
0D67 6A            2532  DIV2    LISL   2           SUBTRACT DIVISOR
0D68 4C            2533          LR     A,S         FROM NUMERATOR
0D69 18            2534          COM
0D6A 1F            2535          INC
0D6B 1A            2536          DI
0D6C 1E            2537          LR     J,W
0D6D 68            2538          LISL   0
0D6E CC            2539          AS     S
0D6F 53            2540          LR     3,A         LO BYTE OF RESULT
0D70 9202   0D73   2541          BNC    DIV3
0D72 1E            2542          LR     J,W
0D73 6B            2543  DIV3    LISL   3
0D74 4C            2544          LR     A,S
0D75 18            2545          COM
```

```
0D76 1D           2546           LR    W,J
0D77 19           2547           LNK
0D78 1E           2548           LR    J,W
0D79 69           2549           LISL  1
0D7A CC           2550           AS    S
0D7B 8204  0D80   2551           BC    DIV4      HI BYTE OF RESULT IN ACC
0D7D 1D           2552           LR    W,J
0D7E 920B  0D8A   2553           BNC   DIV5
0D80 5E           2554   DIV4    LR    D,A       CARRY OUT! SAVE IT
0D81 43           2555           LR    A,3
0D82 5C           2556           LR    S,A
0D83 71           2557           LIS   1         ADD 1 TO QUOTIENT
0D84 6D           2558           LISL  5
0D85 CC           2559           AS    S
0D86 5D           2560           LR    I,A
0D87 4C           2561           LR    A,S
0D88 19           2562           LNK
0D89 5C           2563           LR    S,A
0D8A 1B           2564   DIV5    EI
0D8B 32           2565           DS    2
0D8C 94CA  0D57   2566           BNZ   DIV1
0D8E 0C           2567   DIV9    PK
                  2568   *
                  2569   *
0D8F 08           2570   BNTDC   LR    K,P       BINARY TO DECIMAL CONVERSIO
0D90 71           2571           LIS   1
0D91 52           2572           LR    2,A       BINARY IN REG 53,54
0D92 70           2573           CLR             DEC RESULT IN 50,51
0D93 53           2574           LR    3,A
0D94 65           2575           LISU  5
0D95 68           2576           LISL  0         R2 ADDER LSB
0D96 5D           2577           LR    I,A       R3 ADDER MSB
0D97 5C           2578           LR    S,A
0D98 6C           2579   BNT1    LISL  4
0D99 4E           2580           LR    A,D
0D9A CC           2581           AS    S
0D9B 19           2582           LNK
0D9C 842B  0DC8   2583           BZ    BNT2      BINARY ZERO YET?
0D9E 71           2584           LIS   1
0D9F FC           2585           NS    S         LOOK AT LSBIT
0DA0 840D  0DAE   2586           BZ    BNT3      ADD ADDER TO BCD RESULT
0DA2 68           2587           LISL  0
0DA3 2066         2588           LI    H'66'
0DA5 CC           2589           AS    S
0DA6 D2           2590           ASD   2
0DA7 5D           2591           LR    I,A
0DA8 43           2592           LR    A,3
0DA9 19           2593           LNK             THIS ONLY WORKS BECAUSE
0DAA 2466         2594           AI    H'66'     R3 CAN'T END IN 9
0DAC DC           2595           ASD   S
0DAD 5C           2596           LR    S,A
0DAE 6B           2597   BNT3    LISL  3
0DAF 4C           2598           LR    A,S       SHIFT BINARY RIGHT
0DB0 12           2599           SR    1
0DB1 5D           2600           LR    I,A
0DB2 4E           2601           LR    A,D
0DB3 15           2602           SL    4
0DB4 12           2603           SR    1
0DB5 15           2604           SL    4
0DB6 EC           2605           XS    S
0DB7 5D           2606           LR    I,A
0DB8 4C           2607           LR    A,S
0DB9 12           2608           SR    1
0DBA 5C           2609           LR    S,A
0DBB 42           2610           LR    A,2
0DBC 2466         2611           AI    H'66'     MPY ADDER BY 2, DECIMAL
0DBE D2           2612           ASD   2
0DBF 52           2613           LR    2,A
0DC0 43           2614           LR    A,3
0DC1 19           2615           LNK
0DC2 2466         2616           AI    H'66'
0DC4 D3           2617           ASD   3
0DC5 53           2618           LR    3,A
0DC6 90D1  0D98   2619           BR    BNT1
0DC8 0C           2620   BNT2    PK
                  2621   *
                  2622   *
0DC9 08           2623   MESDIS  LR    K,P       DISPLAY MESSAGE AT DC0
```

```
0DCA 16              2624            LM
0DCB 53              2625            LR      3,A         RIGHT DIGIT
0DCC 16              2626            LM
0DCD 54              2627            LR      4,A
0DCE 16              2628            LM
0DCF 55              2629            LR      5,A
0DD0 16              2630            LM
0DD1 56              2631            LR      6,A         LEFT DIGIT
0DD2 2020            2632   DISBT    LI      32
0DD4 52              2633            LR      2,A         SHIFT OUT DISPLAY
0DD5 60              2634            LISU    0
0DD6 6E              2635            LISL    6
0DD7 1A              2636            DI                  DON'T ALLOW INTERRUPTS
0DD8 48              2637            LR      A,8
0DD9 21B8            2638            NI      H'B8'       DISPLAY BACKPLANE STATUS
0DDB 50              2639            LR      0,A
0DDC 2240            2640            OI      H'40'       TO CLOCK DATA
0DDE 51              2641            LR      1,A
0DDF 4C              2642   DSB4     LR      A,S
0DE0 18              2643   DSB3     COM
0DE1 B1              2644            OUTS    1           MSBIT IS DATA
0DE2 41              2645            LR      A,1
0DE3 B0              2646            OUTS    0           CLOCK DATA OUT
0DE4 40              2647            LR      A,0
0DE5 B0              2648            OUTS    0
0DE6 32              2649            DS      2
0DE7 77              2650            LIS     7           TIME TO CHANGE REGISTERS?
0DE8 F2              2651            NS      2
0DE9 8406 0DF0       2652            BZ      DSB2        NO, JUST SHIFT LEFT
0DEB 4C              2653            LR      A,S
0DEC 13              2654            SL      1
0DED 5C              2655            LR      S,A
0DEE 90F1 0DE0       2656            BR      DSB3        PT TO NEXT REGISTER
0DF0 4E              2657   DSB2     LR      A,D
0DF1 70              2658            CLR
0DF2 C2              2659            AS      2
0DF3 94EB 0DDF       2660            BNZ     DSB4
0DF5 B1              2661            OUTS    1           CLEAR I/O PORT
0DF6 1B              2662            EI
0DF7 0C              2663            PK
                     2664   *
                     2665   *
0DF8 08              2666   DISP     LR      K,P         OUTPUT BCD NUMBERS TO DISPL
0DF9 65              2667            LISU    5
0DFA 69              2668            LISL    1
0DFB 74              2669            LIS     4
0DFC 52              2670            LR      2,A
0DFD 76              2671            LIS     6
0DFE 53              2672            LR      3,A
0DFF 71              2673   DIS2     LIS     1
0E00 F2              2674            NS      2
0E01 4C              2675            LR      A,S
0E02 8403 0E06       2676            BZ      DIS1
0E04 4E              2677            LR      A,D
0E05 15              2678            SL      4
0E06 14              2679   DIS1     SR      4
0E07 2A0EA4 0EA4     2680            DCI     SEGTBL
0E0A 8E              2681            ADC
0E0B 0A              2682            LR      A,IS
0E0C 57              2683            LR      7,A
0E0D 43              2684            LR      A,3
0E0E 0B              2685            LR      IS,A
0E0F 16              2686            LM                  STORE SEGMENT INFO
0E10 5C              2687            LR      S,A
0E11 32              2688            DS      2
0E12 8406 0E19       2689            BZ      DIS3
0E14 33              2690            DS      3
0E15 47              2691            LR      A,7         NEXT DIGIT
0E16 0B              2692            LR      IS,A
0E17 90E7 0DFF       2693            BR      DIS2
0E19 65              2694   DIS3     LISU    5           BLANK ANY?
0E1A 6A              2695            LISL    2
0E1B 4C              2696            LR      A,S
0E1C 13              2697            SL      1
0E1D 8108 0E26       2698            BP      DIS6
0E1F 73              2699            LIS     3           YES
0E20 FC              2700            NS      S
0E21 2403            2701            AI      3
```

```
0E23 0B         2702         LR    IS,A     BLANK SELECTED DIGIT
0E24 70         2703         CLR
0E25 5C         2704         LR    S,A
0E26 65         2705  DIS6   LISU  5         LEADING-ZERO BLANKING
0E27 6A         2706         LISL  2
0E28 2030       2707         LI    H'30'
0E2A FC         2708         NS    S
0E2B 14         2709         SR    4
0E2C 60         2710         LISU  0
0E2D 6E         2711         LISL  6
0E2E 52         2712         LR    2,A
0E2F 840E  0E3E 2713         BZ    DIS7
0E31 70         2714  DIS9   CLR
0E32 CC         2715         AS    S         BLANK IF OFF OR 0
0E33 8405  0E39 2716         BZ    DIS8
0E35 253F       2717         CI    H'3F'
0E37 9406  0E3E 2718         BNZ   DIS7
0E39 70         2719  DIS8   CLR
0E3A 5E         2720         LR    D,A
0E3B 32         2721         DS    2
0E3C 94F4  0E31 2722         BNZ   DIS9
0E3E 65         2723  DIS7   LISU  5         COLON?
0E3F 6A         2724         LISL  2
0E40 70         2725         CLR
0E41 CC         2726         AS    S
0E42 52         2727         LR    2,A
0E43 8105  0E49 2728         BP    DIS10
0E45 46         2729         LR    A,6
0E46 2280       2730         OI    H'80'     SET COLON
0E48 56         2731         LR    6,A
0E49 7C         2732  DIS10  LIS   H'C'
0E4A F2         2733         NS    2         SET DP
0E4B 12         2734         SR    1
0E4C 12         2735         SR    1
0E4D 2402       2736         AI    2
0E4F 0B         2737         LR    IS,A
0E50 4C         2738         LR    A,S
0E51 2280       2739         OI    H'80'
0E53 5C         2740         LR    S,A
0E54 290DD2 0DD2 2741        JMP   DISBT     DONE
                2742   *
0E57 08         2743  COMP   LR    K,P
0E58 43         2744         LR    A,3       RET Z IF R4,5
0E59 18         2745         COM             >= R2,3
0E5A 1F         2746         INC
0E5B C5         2747         AS    5
0E5C 8404  0E61 2748         BZ    COMP1
0E5E 820A  0E69 2749         BC    CORTZ
0E60 0C         2750  CORNZ  PK
0E61 42         2751  COMP1  LR    A,2
0E62 18         2752         COM
0E63 1F         2753         INC
0E64 8404  0E69 2754         BZ    CORTZ
0E66 C4         2755         AS    4
0E67 92F8  0E60 2756         BNC   CORNZ
0E69 2100       2757  CORTZ  NI    0
0E6B 0C         2758         PK
                2759   *
0E6C 08         2760  LMCD   LR    K,P
0E6D 68         2761         LISL  0
0E6E 67         2762  LBTH   LISU  7
0E6F 16         2763         LM
0E70 5D         2764         LR    I,A
0E71 203F       2765         LI    H'3F'
0E73 8A         2766         NM
0E74 5C         2767         LR    S,A
0E75 0C         2768         PK
0E76 08         2769  LMPR   LR    K,P
0E77 6A         2770         LISL  2
0E78 90F5  0E6E 2771         BR    LBTH
                2772   *
                2773   *     TABLES
                2774   *
                2775   *
0E7A 503974     2776  MSSHCR DC    H'5039746D'
                2777   *
0E7E 380677     2778  MSFAIL DC    H'38067771'
                2779   *
```

```
0E82 FFFFFF    2780  MSINIT  DC    H'FFFFFFFF'
               2781  *
0E86 4000      2782  SQTAB   DC    H'4000'    SLOPE, THEN OFFSET
0E88 1B40      2783          DC    H'1B40'
0E8A 145B      2784          DC    H'145B'
0E8C 116F      2785          DC    H'116F'
0E8E 0F80      2786          DC    H'0F80'
0E90 0E8F      2787          DC    H'0E8F'
0E92 0D9D      2788          DC    H'0D9D'
0E94 0CA9      2789          DC    H'0CA9'
0E96 0BB5      2790          DC    H'0BB5'
0E98 0AC0      2791          DC    H'0AC0'
0E9A 0ACA      2792          DC    H'0ACA'
0E9C 09D4      2793          DC    H'09D4'
0E9E 09DE      2794          DC    H'09DE'
0EA0 09E7      2795          DC    H'09E7'
0EA2 08EF      2796          DC    H'08EF'
               2797  *
0EA4 3F065B    2798  SEGTBL  DC    H'3F065B4F66'
0EA9 6D7D07    2799          DC    H'6D7D077F6F40'
               2800  *
0EAF E803      2801  HXCNV   DC    H'E803'
0EB1 6400      2802          DC    H'6400'
0EB3 0A00      2803          DC    H'0A00'
               2804  *
               2805  *
               2806  *CORRECTION FACTORS FOR CONTROL CONSTANT
               2807  *  KEY: E=ENGLISH, M=METRIC
               2808  *       L=LO PRESS RANGE, I=MED, H=HI
               2809  *       1=XXX.X, 2=XX.XX, 3=X.XXX Q FORMAT
0EB5 0C6EDA    2810  KFUDGE  DC    H'0C6EDA'  E L 2
0EB8 0ACD88    2811          DC    H'0ACD88'  M L 2
0EBB 0CE5CD    2812          DC    H'0CE5CD'  E I 2
0EBE 0AD088    2813          DC    H'0AD088'  M I 2
0EC1 0C0BA8    2814          DC    H'0C0BA8'  E H 2
0EC4 09C0D7    2815          DC    H'09C0D7'  M H 2
0EC7 108588    2816          DC    H'108588'  E L 3
0ECA 06E1DA    2817          DC    H'06E1DA'  M L 1
0ECD 10AF80    2818          DC    H'10AF80'  E I 3
0ED0 06E6DA    2819          DC    H'06E6DA'  M I 1
0ED3 0F0ED2    2820          DC    H'0F0ED2'  E H 3
0ED6 0699AC    2821          DC    H'0699AC'  M H 1
               2822  *
               2823  *
0ED9 041804    2824  DSPTBL  DC    H'041804C00200404'
0EE1 001808    2825          DC    H'0018080400200804'
               2826  *
0EE9 404040    2827  MESDAS  DC    H'40404040'
               2828  *
0EED 9D2A6E    2829  DSACAL  DC    H'9D2A6E34'
               2830  *
0EF1 8F8250    2831  PFUDGE  DC    H'8F8250BD'
0EF5 852B1B    2832          DC    H'852B1B3F'
0EF9 990BD2    2833          DC    H'990BD210'
               2834  *
0EFD 050120    2835  GFUDGE  DC    H'050120032621'
               2836  *
0F03 11A596    2837  ARFDGE  DC    H'11A5960E05C0'
               2838  *
               2839  *
0F09 181A1E    2840  VALLOC  DC    H'181A1E1C001C261E'
               2841  *
0F11 808024    2842  DSTBL   DC    H'8080243024242418'
0F19 303024    2843          DC    H'3030241824242424'
               2844  *
0F21 00FBFA    2845  PRDIST  DC    H'00FBFA0017AD'
0F27 023CBC    2846          DC    H'023CBC02D181'
0F2D 049AB0    2847          DC    H'049AB00387F3'
               2848  *
0F33 004000    2849  SPCONV  DC    H'00400067'
               2850  *
               2851  *
0F37 14220E    2852  PLTAB   DC    H'14220E'
               2853  *
0F3A 50735C    2854  MSLPR   DC    H'50735C38'
               2855  *
```

```
0F3E 507310      2856  MSHPR    DC    H'50731076'
                 2857  *
0F42 507973      2858  MSINAC   DC    H'50797377'
                 2859  *
0F46 B1EA88      2860  DISFUD   DC    H'B1EA8847'
                 2861  *
                 2862  *
                 2863           END
0 ERRS
```

While the invention has been described above with reference to a preferred embodiment, the invention is not limited thereto. Those skilled in the art may devise various changes, modifications and alternatives upon reading the foregoing descriptions. Accordingly, the invention includes such changes, alternatives and modifications insofar as they fall within the spirit and scope of the appended claims.

The invention is claimed as follows:

1. An automatic control system for a vehicular liquid sprayer which pumps liquid at a desired pressure to a plurality of nozzles which dispense liquid at a desired volume per unit area application rate, said application rate being a function of predetermined properties of said vehicular liquid sprayer and of the liquid, said control system comprising: pressure sensing means for sensing the instantaneous pressure of the liquid supplied to said nozzles and for producing a corresponding pressure electrical signal, means for measuring the ground speed of said vehicular liquid sprayer and for producing a corresponding ground speed electrical signal, control circuit means for receiving said pressure signal and said ground speed signal, operator accessible control means for delivering to said control circuit means input electrical signals corresponding to a desired application rate, to the number of nozzles associated with said vehicular liquid sprayer and to the nozzle spacing, said control circuit means being responsive to said pressure signal, said ground speed signal and said input signals for calculating a desired pressure of the liquid supplied to said nozzles necessary to achieve said desired application rate and for calculating the difference between said desired pressure and said instantaneous pressure and producing a first output control signal of a magnitude corresponding to the difference between said desired pressure and said instantaneous pressure and a second output control signal corresponding to the sign of said difference, duty cycle control means for converting said first output control signal to a cyclical control signal of a fixed period whose duty cycle varies in proportion to the magnitude of said first output control signal and pressure control means responsive to said cyclical control signal and to said second output control signal for varying said instantaneous pressure in the amount and direction necessary to equal said desired pressure to thereby achieve and thereafter maintain said desired application rate.

2. A control system according to claim 1 wherein said control circuit means further includes means responsive to said calculated desired pressure being below a predetermined minimum value for producing predetermined first and second output control signals, said duty cycle control means and said pressure control means being responsive to said predetermined first and second output control signals for establishing substantially zero instantaneous pressure of said liquid supplied to said nozzles.

3. A control system according to claim 2 wherein said control circuit means further includes means responsive to said instantaneous pressure being at or below a predetermined minimum value and said calculated desired pressure being at or above said predetermined minimum value for driving said first output control signal to a predetermined maximum magnitude irrespective of the difference between said desired pressure and said instantaneous pressure, until said instantaneous pressure exceeds said predetermined minimum value.

4. A control system according to claim 1 wherein said predetermined variable properties comprise the nominal flow characteristics of said nozzles and the nominal relative density of said liquid and wherein said operator accessible control means further includes means for delivering to said control circuit means control input signals corresponding to said nominal flow characteristics and to said nominal relative density, said control circuit means including means for taking into account said nominal flow characteristics and said nominal density in calculating said desired pressure.

5. A control system according to claim 4 wherein said operator accessible control means includes means for varying the control input signal corresponding to said desired application rate by an amount less than or equal to a predetermined percentage in either direction so as to achieve and maintain said desired application rate substantially without regard for variations in the flow characteristics of said nozzles or in the relative density of said liquid from their respective nominal values.

6. A control system according to claim 1 or claim 5 and further including display means, said control circuit means including means for calculating the instantaneous application rate in accordance with said instantaneous pressure signal and said ground speed signal and for energizing said display means to display said instantaneous application rate.

7. A control system according to claim 6 wherein said operator accessible control means includes manual override means for disabling the production of said first and second control output signals by said control circuit means and for actuating said pressure control means directly to achieve and maintain said desired application rate by observing said display of said instantaneous application rate.

8. A control system according to claim 1 or claim 5, said control circuit means further including means for producing a test ground speed signal corresponding to a known predetermined ground speed when said vehicular liquid sprayer is stationary so as to achieve and maintain a known predetermined application rate, whereby the liquid discharged from said nozzles may be collected and measured, thereby providing an indication of a desired amount of variation in said control input signal corresponding to said desired application rate for achieving and maintaining said desired application rate.

9. A control system according to claim 8 and further including display means, said control circuit means including means for energizing said display means to display said instantaneous pressure whereby said displayed pressure may be compared with a known desired pressure to be achieved and maintained in response to said test ground speed signal and said desired application rate signal to verify the proper functioning of said control system.

10. A control system according to claim 1 or claim 5 wherein said duty cycle control means includes means for producing a ramp signal of predetermined peak-to-peak value and at a predetermined constant frequency, means responsive to said first output control signal for producing an error signal of analog value corresponding to the magnitudes of said first output control signal and comparator means for receiving and comparing the values of said error signal and said ramp signal and thereby producing said cyclical control signal.

11. An automatic control system for a vehicular liquid sprayer which pumps liquid at a desired pressure to a plurality of nozzles which dispense liquid at a desired volume per unit area application rate, said application rate being a function of said desired pressure, of the ground speed of said vehicular liquid sprayer and of predetermined properties of said vehicular liquid sprayer and of the liquid, said vehicular liquid sprayer including pressure sensing means for sensing the instantaneous pressure of the liquid supplied to said nozzles and for producing a corresponding pressure electrical signal and ground speed sensing means for measuring the ground speed of said vehicular liquid sprayer and for producing a corresponding ground speed electrical signal, said control system comprising: control circuit means for receiving said pressure signal and said ground speed signal, operator accessible control means for delivering to said control circuit means input electrical signals corresponding to a desired application rate and to said predetermined properties of said vehicular liquid sprayer and of the liquid, said control circuit means including calculating means responsive to said pressure signal, said ground speed signal and said input signals for calculating said desired pressure, and for producing an error signal corresponding to the difference between said desired pressure and said instantaneous pressure and an output control signal corresponding to the sign of said difference, pressure control means responsive to said error signal and said output control signal for varying said instantaneous pressure in the amount and direction necessary to achieve and maintain said desired pressure, said control circuit means further including means responsive to said calculated desired pressure being below a predetermined minimum value for producing a predetermined error signal and a predetermined output control signal, said pressure control means being responsive to said predetermined error signal and said predetermined output control signal for establishing substantially zero instantaneous pressure to said nozzles, and said control circuit means further including means responsive to said instantaneous pressure being at or below a predetermined minimum value and said calculated desired pressure being at or above said predetermined minimum value for producing a predetermined maximum error signal and a predetermined output control signal until said instantaneous pressure exceeds said predetermined minimum value.

12. A control system according to claim 11 wherein said predetermined variable properties comprise the nominal flow characteristics of said nozzles and the nominal relative density of said liquid and wherein said operator accessible control means further includes means for delivering to said control circuit means control input signals corresponding to said nominal flow characteristics and to said nominal relative density, said control circuit means including means for taking into account said nominal flow characteristics and said nominal density in calculating said desired pressure.

13. A control system according to claim 12 wherein said operator accessible control means includes means for varying the control input signal corresponding to said desired application rate by an amount less than or equal to a predetermined percentage in either direction so as to achieve and maintain said desired application rate substantially without regard for variations in the flow characteristics of said nozzles or in the relative density of said liquid from their respective nominal values.

14. An automatic control system for a vehicular liquid sprayer which pumps liquid at a desired pressure to a plurality of nozzles which dispense liquid at a desired volume per unit area application rate, said application rate being a function of said desired pressure, of the ground speed of said vehicular liquid sprayer and of predetermined variable properties of said vehicular liquid sprayer and of the liquid, said vehicular liquid sprayer including pressure sensing means for sensing the instantaneous pressure of the liquid supplied to said nozzles and for producing a corresponding pressure electrical signal and ground speed sensing means for measuring the ground speed of said vehicular liquid sprayer and for producing a corresponding ground speed electrical signal, said control system comprising: control circuit means for receiving said pressure signal and said ground speed signal, operator accessible control means for delivering to said control circuit means input electrical control signals corresponding to nominal values of said predetermined variable properties of said vehicular liquid sprayer and of the liquid and corresponding to a desired application rate, said control circuit means being responsive to said pressure signal, said ground speed signal and said control signals for calculating a desired pressure of the liquid supplied to said nozzles necessary to achieve said desired application rate and for calculating the difference between said desired pressure and said instantaneous pressure and producing control output signals corresponding to said difference and to the sign of said difference and pressure control means responsive to said control output signals for varying said instantaneous pressure in the amount and direction necessary to achieve said desired pressure to thereby achieve and maintain said desired application rate, and wherein said operator accessible control means further includes means for varying the control signal corresponding to said desired application rate by an amount less than or equal to a predetermined percentage so as to achieve and maintain said application rate substantially without regard for variations in said variable properties from the nominal values established by said operator accessible control means.

15. A control system according to claim 11 or claim 14 and further including duty cycle control means interposed between said control circuit means and said pressure control means for producing a cyclical control signal of a fixed period and of variable duty cycle, said variable duty cycle varying in proportion to the magnitude of said error signal when said instantaneous pressure is above said predetermined minimum value and said desired pressure is above said predetermined minimum value.

16. A control system according to claim 15 wherein said duty cycle control means includes means for producing a ramp signal of predetermined peak-to-peak value and at a predetermined constant frequency, means responsive to said first output control signal for producing an error signal of analog value corresponding to the magnitude of said first output control signal and comparator means for receiving and comparing the values of said error signal and said ramp signal and thereby producing said cyclical control signal.

17. A control system according to claim 14 wherein said predetermined variable properties comprise the nominal flow characteristics of said nozzles and the nominal relative density of said liquid and wherein said operator accessible control means further includes means for delivering to said control circuit means control input signals corresponding to said nominal flow characteristics and to said nominal relative density, said control circuit means including means for taking into account said nominal flow characteristics and said nominal density in calculating said desired pressure.

18. An improvement in a control system for a mobile material distribution apparatus wherein the rate of material distribution per unit area varies as a predetermined function of the ground speed of the mobile apparatus and including ground speed sensor means for developing a ground speed signal corresponding to the ground speed of the mobile apparatus, distributing means for distributing said material along a given path of travel of the apparatus, variable rate delivery means for delivering material at a controllable rate to said distributing means, delivery rate sensor means for developing an actual delivery rate signal corresponding to actual rate of delivery of material and desired distribution rate control means for developing a desired distribution rate signal corresponding to a desired distribution rate of material per unit area, the improvement comprising: control circuit means responsive to said ground speed signal, to said actual delivery rate signal and to said desired distribution rate signal for calculating a desired delivery rate of material to the distributing means necessary to achieve said desired distribution rate and for calculating the difference between said desired delivery rate and said actual delivery rate and for developing a corresponding difference signal and duty cycle control means responsive to said difference signal for developing a cyclical control signal whose duty cycle varies in a predetermined fashion in accordance with said difference signal, said delivery means being responsive to said cyclical control signal for varying the delivery rate of material to said distributing means in the amount necessary to achieve said desired material delivery rate so as to achieve and thereafter maintain said desired distribution rate.

19. The improvement according to claim 18 wherein said control circuit means further includes maximum output signal means responsive to said difference signal being at or above a predetermined value for developing a maximum value output signal in place of said cyclical control signal, said delivery means being responsive to said maximum output signal for varying the delivery rate of material at a maximum rate of change until said difference signal falls below said predetermined value.

20. The improvement according to claim 18 wherein said desired rate control means further includes means for developing a percentage variation signal for varying the desired distribution rate signal by an amount less than or equal to a predetermined percentage thereof in either direction so as to achieve and maintain said desired distribution rate substantially without regard for variations in the nominal operating characteristics of said material distribution apparatus.

21. The improvement according to claim 18 and further including operator accessible manual control means for controlling said delivery means directly to achieve and maintain said desired distribution rate.

* * * * *